(12) United States Patent
Elsayed et al.

(10) Patent No.: US 10,392,267 B2
(45) Date of Patent: Aug. 27, 2019

(54) AZO DYE INTERCALATED FE(II)/FE(III) LAYERED DOUBLE HYDROXIDE FOR WATER PURIFICATION

(71) Applicant: King Abdulaziz University, Jeddah (SA)

(72) Inventors: Waleed Elsayed Mahmoud Elsayed, Jeddah (SA); Ahmed Abdullah Salem Al-Ghamdi, Jeddah (SA); Yusuf Abdulaziz Al-Turki, Jeddah (SA)

(73) Assignee: King Abdulaziz University, Jeddah (SA)

( * ) Notice: Subject to any disclaimer, the term of this patent is extended or adjusted under 35 U.S.C. 154(b) by 253 days.

(21) Appl. No.: 15/490,449

(22) Filed: Apr. 18, 2017

(65) Prior Publication Data

US 2018/0297864 A1 Oct. 18, 2018

(51) Int. Cl.
*C02F 1/28* (2006.01)
*B01J 20/06* (2006.01)
*B01J 20/22* (2006.01)
*B01J 20/28* (2006.01)
*B01J 20/30* (2006.01)
*C02F 103/34* (2006.01)
(Continued)

(52) U.S. Cl.
CPC ............. *C02F 1/288* (2013.01); *B01J 20/06* (2013.01); *B01J 20/22* (2013.01); *B01J 20/28007* (2013.01); *B01J 20/3071* (2013.01); *B01J 20/3085* (2013.01); *C01G 49/0018* (2013.01); *C01G 49/02* (2013.01); *C01P 2002/22* (2013.01); *C02F 1/281* (2013.01); *C02F 1/285* (2013.01); *C02F 2103/343* (2013.01); *C02F 2303/16* (2013.01)

(58) Field of Classification Search
None
See application file for complete search history.

(56) References Cited

U.S. PATENT DOCUMENTS

| 6,656,382 B1 | 12/2003 | Kuhlmann et al. |
| 9,051,190 B2 | 6/2015 | Genin et al. |
| 2016/0296557 A1 | 10/2016 | Applewhite et al. |

FOREIGN PATENT DOCUMENTS

| BR | 102013015716-3 | * 8/2015 | ............... C09C 1/02 |
| CN | 101575504 A | * 11/2009 | |
| CN | 105964257 A | * 9/2016 | |

(Continued)

OTHER PUBLICATIONS

Wang et al, "Use of Fe(II)Fe (III)-LDHs prepared by co-precipitation method in a he terogen eous-Fenton process for degrada tion of Methylene Blue", Catalysis Today 224 (2014) 41-48.*

(Continued)

*Primary Examiner* — Krishnan S Menon
(74) *Attorney, Agent, or Firm* — Oblon, McClelland, Maier & Neustadt, L.L.P.

(57) ABSTRACT

A nanostructured material having a coral reef morphology of nanoflake walls is described. The nanostructured material comprises a Fe(II)/Fe(III) layered double hydroxide intercalated with an azo dye, and a synthesis method is discussed. The nanostructured material may be used to remove a contaminant from a solution by adsorption. The nanostructured material may be cleaned and reused with high adsorption efficiency.

21 Claims, 13 Drawing Sheets

(51) Int. Cl.
       *C01G 49/02*      (2006.01)
       *C01G 49/00*      (2006.01)

(56) References Cited

FOREIGN PATENT DOCUMENTS

| IN | 201207798 P4 | 3/2014 | | |
|---|---|---|---|---|
| IN | 275230 B | 9/2016 | | |
| WO | WO-2007088343 A2 * | 8/2007 | ........... | A61K 9/1611 |
| WO | WO-2015193087 A1 * | 12/2015 | ............. | C01G 49/00 |

OTHER PUBLICATIONS

Christian Ruby, et al., "Synthesis and transformation of iron-based layered double hydroxides", Applied Clay Science, vol. 48, 2009, pp. 195-202.

Jean-Marie R. Génin, et al., "Structure and stability of the Fe(II)—Fe(III) green rust "fougerite" mineral and its potential for reducing pollutants in soil solutions", Applied Geochemistry, vol. 16, Issue 5, Apr. 2001, pp. 559-570 (Abstract only).

\* cited by examiner

AZO DYE INTERCALATED FE(II)/FE(III) LAYERED DOUBLE HYDROXIDE FOR WATER PURIFICATION

STATEMENT OF ACKNOWLEDGEMENT

This project was prepared with financial support by the DSR under Grant No. (P-003-130-436).

BACKGROUND OF THE INVENTION

Technical Field

The present invention relates to a nanostructured material including a Fe(II)/Fe(III) layered double hydroxide intercalated with an azo dye, its synthesis, and methods of use in reducing a contaminant concentration.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The release of organic contaminants into the aquatic environment from wastewater effluents has gained recent attention. Among the organic contaminants, pharmaceutical and endocrine-disrupting compounds (EDC) are of special concern, due to their large variety and high consumption over the past years. Water pollution with pharmaceutical and endocrine-disrupting compounds is attributed to several sources, such as emission from production sites due to inadequate treatment of manufacturing effluents, direct disposal of unused medicine and drug-containing waste, and human and animal medical care. See Perez-Estrada et al., Catal. Today 101 (2001) 219. Low concentrations of pharmaceutical compounds and their transformation products have been detected in water, clearly showing that some pharmaceutical products cannot be eliminated during conventional wastewater treatment. See Trovo et al., J. Photochem. Photobiol. A: Chem. 198 (2008) 215 and Benotti et al., Water Res. 43 (2009) 1513.

To date, several pharmaceuticals have been found in tap water in Europe and the United States at concentrations ranging from ng/L level to low µg/L. See Heberer et al., Toxicology Letters 131 (2002) 5; Jones et al., Trends Biotechnol. 23 (2005) 163; Loos et al., Anal. Bioanal. Chem. 387 (2007) 1469; Loraine and Pettigrove, Environ. Sci. Technol. 40 (2006) 687; McLachlan et al., Ann. N.Y. Acad. Sci. 948 (2001) 153; and Mompelat et al., Environ. Int. 35 (2009) 814. The first work reporting the presence of pharmaceuticals in drinking water was published in 1998 under the title, Occurrence and distribution of organic contaminants in the aquatic system in Berlin. Part II: substituted phenols in Berlin surface water. See Heberer et al., Acta Hydrochem. Hydrobiol. 26 (1998) 27. Here, the researchers reported finding clofibric acid, the active metabolite of some blood lipid regulators, in Berlin tap water at concentrations exceeding 165 ng/L. Later, McLachlan et al. showed the presence of endocrine distrupting compounds (EDCs), such as 17β-estradiol, estriol, and nonylphenol in drinking water while Loos et al. described the presence of pharmaceuticals such as carbamazepine, gemfibrozil, and bezafibrate in tap water from Italy. See McLachlan et al., Ann. N.Y. Acad. Sci. 948 (2001) 153, and Loos et al., Anal. Bioanal. Chem. 387 (2007) 1469. The presence of these compounds in water may have potential health effects on humans, through drinking the water directly or by consuming food irrigated by polluted water. These compounds may additionally affect aquatic organisms in unpredictable ways. Pomati et al. showed how a mixture of thirteen drugs commonly found in the environment at sub-therapeutic levels inhibited the growth of human embryonic kidney 293 cells (HEK293) by as much as 30% compared to controls. See Pomati et al., Environmental Science & Technology 40 (2006) 2442. It was concluded that the mixture of drugs at environmental exposure levels inhibited cell proliferation by affecting the physiology and morphology of the HEK293 cells. Therefore, it is necessary to adequately treat effluents containing pharmaceutical compounds before discharging the treated waste water.

The non-patent article titled, Ozonation and advanced oxidation technologies to remove endocrine disrupting chemicals (EDCs) and pharmaceuticals and personal care products (PPCPs) in water effluents, disclosed a method for water treatment called advanced oxidation processes. See Espulgas, et al., J. Hazard. Mater. 149 (2007) 631. This process is aimed at in-situ generation of strong oxygen-based oxidizers: hydroxyl radicals (•OH), ozone ($O^3$), ozone radical ions ($O^{3-}$), atomic oxygen ($O_2$), hydrogen peroxide ($H_2O_2$), and hydroperoxyl radicals ($HO_2•$). The formation of hydroxyl radicals is desired, since these radicals are among the strongest oxidizers and react non-selectively with various types of pollutants. The objective is either complete mineralization or partial degradation of the chemical compounds, which is in most cases sufficient in order to make the effluent more amenable to conventional treatment.

The non-patented article titled, Hydrogen peroxide and ozone formation in hybrid gas-liquid electrical discharge reactors, disclosed a water treatment involving the creation of plasma either directly in the liquid, or in the gas above the liquid, or, in case of hybrid rectors, both in liquid and in gas. See Lukes et al., IEEE Trans. Ind. Appl. 40 (2004) 60. It was found that electrical discharges in liquids initiate various physical and chemical effects, such as high electric fields, intense UV radiation, shock waves, as well as the formation of chemically active species such as radicals (H•, O•, •OH) and other molecules ($H_2O_2$, $H_2$, $O_2$, $O_3$) for the removal of pollutants.

The non-patent article titled, Mechanism of photodegradation of aqueous organic pollutant. 2. Measurement of primary rate constants for reaction of OH radicals with benzene and some halobenzenes using an EPR spin-trapping method following the photolysis of $H_2O_2$, disclosed a process to remove hazardous organic compounds from industrial wastewater by the Fenton process, which is an advanced oxidation process using a mixture of $Fe^{2+}$ and $H_2O_2$ as the oxidizing agent. See Kochany et al., Environ. Sci. Technol. 26 (1992) 262. Hydrogen peroxide reacts with the ferrous ions in water and generates free hydroxyl radicals, which have high oxidation potential and can oxidize a wide range of organic compounds.

These chemical oxidation methods are not favorable from an economic point of view due to the high energy requirements. Chemical oxidation methods furthermore result in the formation of byproducts which are sometimes more toxic than the degraded organic compounds.

The non-patent article titled, Evaluation of a photocatalytic reactor membrane pilot system for the removal of pharmaceuticals and endocrine disrupting compounds from water, discloses a method to remove pharmaceuticals from water using a photocatalytic reactor membrane pilot system, which employs UV/TiO$_2$ photocatalysis. See Benotti et al., *Water Research* 43 (2009) 1513. Unfortunately, this method is used rarely, mainly due to high costs and may only be financially viable when very dilute streams have been pre-concentrated. Adding to this disadvantage, processes used to pre-concentrate dilute streams are themselves very expensive, labor intensive, and require large amounts of energy.

The non-patent article titled, *Reactive liquid—liquid extraction of heavy metals from leachate with oil-soluble complexing surfactants,* disclosed a relatively cheap and robust method of liquid-liquid extraction for the separation and pre-concentration of compounds and has also been used as an important separation process in water treatment. See Woller, et al., *Colloids and Surfaces A: Physicochemical and Engineering Aspects* 117 (1996) 189. Unfortunately this process is susceptible to several problems, including being unfeasible for large volumes of dilute streams due to the need for an extremely high contact area. These obstacles can be overcome by increasing agitation speed and/or the volume of the solvent used, but this can lead to elevated costs and/or the formation of stable emulsions, which are difficult to remove and prevent the recycling of the solvent for future use. The extraction solvent may also contaminate the water being treated due to direct contact of the two phases.

Besides the chemical oxidation and photocatalysis methods, sorption processes are another set of methods currently used to remove pollutants from waste water. The sorption process can be an efficient method to remove organic pollutants from waste water, however, the common absorbents, such as zeolites, natural fibers, and activated carbon, suffer from low adsorption capacity and low separation selectivity. See A. Bayat et al., *Chem. Eng. Technol.* 28 (2005) 1525; M. O. Adebajo et al., *J. Porous. Mater.* 10 (2003) 159; and G. Deschamps et al., *Environ. Sci. Technol.* 37 (2003) 1013.

Hydrotalcite-like compounds called "layered double hydroxides" have shown promise as an absorbent material for cleaning waste water owing to their low cost and environmental friendliness. Patent publication WO2011108195A1 discloses a method of synthesizing a hydrotalcite compound which can be used as an anion adsorbent by recycling industrial waste steel slag. The hydrotalcite compound synthesized by this method is represented by the general formula [Ca$_{2+a-x}$, MxAlO$_{3-b}$]A$_y$. When the hydrotalcite compound having this structure is calcined alone, the formed oxide agglomerates, thereby reducing activity. Since this compound has a single hydrotalcite structure, the type of ion able to be adsorbed is limited.

Patent JP-A 2008-144412 discloses a method of synthesizing a Co(II)Fe(III)-LDH particle having a low coercive force. The particle synthesized by this method is a Co(II)Fe(III)-LDH particle and a precursor of a CoFe-based ferrite substance. However, since it has no CoFe ferrite structure, it cannot fully exhibit physical properties as a magnetic substance.

Patent JP-A 2007-299039 discloses a method of providing an LDH with ultraviolet absorbing abilities by introducing the anion of 2-hydroxy-4-methoxybenzophenone-5-sulfonic acid (abbreviated as BP) between Mg—A—NO$_3$ type hydrotalcite layers. This method has a disadvantage that a waste liquid after exchange is colored deep yellow, whereby its treatment imposes a burden on the environment.

Patent application WO2015193087A1 discloses a method for synthesizing a hydrotalcite compound which can be used to reduce the arsenic content of impure water from 300 ppb to <10 ppb. The layered double hydroxide synthesized by this method has the general formula $[(M^2)_{1-x}(M^3)_x(OH_2]^x (A^{n-})_{x/n}$ mH$_2$O, where M$^{2+}$ is Zn$^{2+}$, Cu$^{2+}$, Fe$^{2+}$, or Ca$^{2+}$; M$^{3+}$ and Al$^{3+}$ or Fe$^{3+}$; and A$^{n-}$ is CO$_3^{2-}$, OH$^-$, Cl$^-$, NO$_3^-$, SO$_4^{2-}$, or PO$_4^{3-}$, "x" is in the range of 0.05 to 0.5, "n" is in the range of 1 to 10, and "m" is in the range of 0 to 10; wherein said layered double hydroxide is in the powdered form with a minimum particle size of 50 µm. This method has the disadvantage that the powder form limits the adsorption capacity of this material. However, the intercalation of the developed hydrotalcites with CO$_3^{2-}$, OH$^-$, Cl$^-$, NO$_3^-$, SO$_4^{2-}$, or PO$_4^{3-}$ anions reduce the wide application of these compounds and are limited for arsenic adsorption only.

Patent application WO2005012194A1 discloses filter media comprising LDH and lignin, for the removal of inorganic and organic contaminants from aqueous solutions. Lignin, due to its negatively charged surface, is said to offer binding sites for positively-charged metal ions, in particular the positively-charged ions of toxic metals. It is further indicated that compositions of a lignin compound and a LDH can possess affinity with both positively-charged and negatively-charged contaminants.

Patent application WO20090 10376 A1 discloses a composition and a process for purification of contaminated water, especially for the removal of harmful contaminants like arsenic in addition to the removal of other harmful microbial contaminants and suspended particulate impurities, to make the water suitable for human consumption. The synthesized layered double hydroxide compound has divalent cations of magnesium, zinc, or copper, and trivalent cations of aluminum or iron. The intercalated anions may be OH$^-$, CO$_3^{2-}$, Cl$^-$, NO$_3^-$, SO$_4^{2-}$, PO$_4^{3-}$, or Fe(CN)$_6^{3-}$. However, in terms of water purification abilities, the adsorption is slow because it depends on the rate of anion exchange. The layered double hydroxide was also limited to arsenic adsorption and cannot be used to adsorb contaminant dyes or pharmaceutical compounds.

Although the previously discussed materials overcome certain principal drawbacks, they show unsatisfactory regeneration and cycling ability. In addition, there is still no simple and high-efficiency method to synthesize layered double hydroxides or hydrotalcite-like nanostructures with precise structural control for good absorption properties in terms of both capacity and kinetics. The desired absorbent materials should also exhibit a low density for high gravimetric capacity, easy separation from the purified water, and easy cleaning for long-term cycling. To meet these requirements, one promising route is to have strongly adsorbing elements formed in a precise nanoarchitecture. In view of the foregoing, one objective of the present invention is to present a nanostructured material with a coral reef morphology comprising a plurality of nanoflake walls made of a Fe(II)/Fe(III) layered double hydroxide intercalated with an azo dye, its facile one pot synthesis, and its use in water purification.

BRIEF SUMMARY OF THE INVENTION

According to a first aspect, the present disclosure relates to a nanostructured material comprising Fe(II)/Fe(III) double hydroxide layers and an azo dye intercalated between the layers. The nanostructured material is in the form of a coral reef morphology having a plurality of nanoflake walls. The nanoflake walls have a thickness of 10-35 nm and a longest dimension of 100 nm-1 µm.

In one embodiment of the nanostructured material, the Fe(II)/Fe(III) double hydroxide layers are spaced apart by 1.7-2.3 nm.

In one embodiment of the nanostructured material, the nanoflake walls have a rhombohedral lattice crystal structure.

In one embodiment of the nanostructured material, the nanoflake walls have a hexagonal lattice crystal structure.

In one embodiment of the nanostructured material, the azo dye is calconcarboxylic acid.

In one embodiment of the nanostructured material, the average maximum distance between adjacent nanoflake walls is 70-120 nm.

In one embodiment of the nanostructured material, the Fe(II)/Fe(III) double hydroxide layers have a Fe(II) to Fe(III) molar ratio of 2:1-4:1.

In one embodiment of the nanostructured material, the nanoflake walls have a formula $[(Fe^{2+})_{1-x}(Fe^{3+})_x(OH^-)_2]^{x-}[(A^{n-})_{x/n}]^{x-} \cdot mH_2O$, where "x" is in the range of 0.05 to 0.50, "n" is in the range of 1 to 10, "m" is in the range of 0 to 10, and "A" is carbonate, hydroxide, chloride, nitrate, sulfate, phosphate, acetylacetonate, or an azo dye.

According to a second aspect, the present disclosure relates to a method for producing the nanostructured material of the first aspect. These steps involve mixing a ferrous ligand coordination complex, a ferric ligand coordination complex, and an alkylamine to form a first mixture; mixing an azo dye, water, an organic solvent, and an amine oxide with the first mixture to form a second mixture; heating the second mixture to form a precipitate; and washing and drying the precipitate to form the nanostructured material.

In one embodiment, the first mixture comprises the ferrous ligand coordination complex and the ferric ligand coordination complex at a molar ratio of 2:1-4:1.

In one embodiment, the ferrous ligand coordination complex is ferrous acetylacetonate, and the ferric ligand coordination complex is ferric acetylacetonate.

In one embodiment, the alkylamine comprises at least one tertiary amine and 8-30 carbon atoms per molecule.

In further embodiment, where the alkylamine comprises at least one tertiary amine and 8-30 carbon atoms per molecule, the alkylamine is N-oleyl diethanolamide.

In one embodiment, the azo dye is calconcarboxylic acid.

In one embodiment, the amine oxide is trimethylamine N-oxide.

In one embodiment, the second mixture is heated to 150-250° C.

According to a third aspect, the present disclosure relates to a method of reducing a contaminant concentration in a solution. The method involves mixing the nanostructured material of the first aspect with the solution comprising the contaminant at a concentration of 50 mg/L-2 g/L. The concentration of the nanostructured material in the solution after mixing is 0.5-100 mg/L, and the nanostructured material reduces the contaminant concentration in the solution by adsorption.

In one embodiment, the contaminant is a pharmaceutical compound selected from the group consisting of an antibiotic, a hormone, an anti-inflammatory, an antihypertensive, an anticonvulsant, an antidepressant and a lipid regulator.

In one embodiment, the method of the third aspect further involves the steps of removing the nanostructured material from the solution with a magnet to produce a recovered nanostructured material; mixing the recovered nanostructured material with an acidic solution; drying the acidic solution to produce a cleaned nanostructured material; mixing the cleaned nanostructured material with the azo dye to produce a recharged nanostructured material; and reusing the recharged nanostructured material, which maintains adsorption capacity for at least 10 purification cycles.

In one embodiment, the acidic solution comprises one or more inorganic acids at a total concentration of 0.2-1.0 M.

In one embodiment, the mass ratio of the azo dye to the cleaned nanostructured material is 50:1-200:1.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
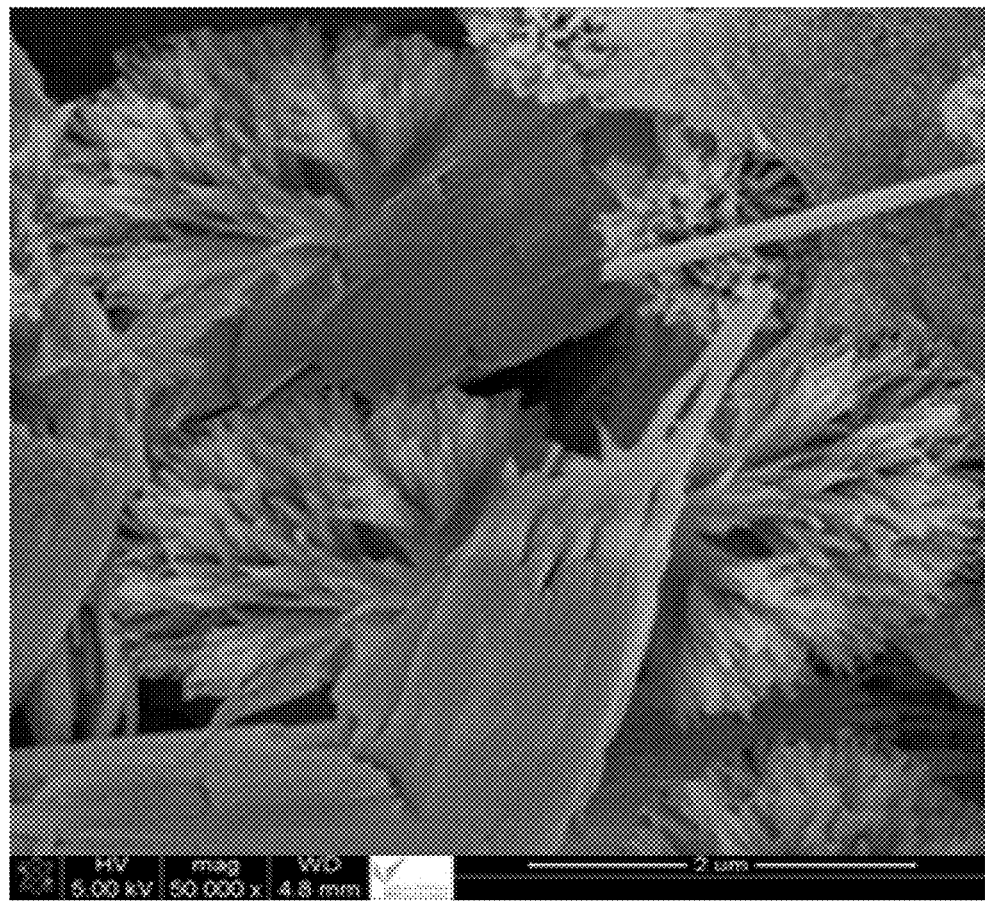
FIG. 1A is a scanning electron microscopy (SEM) image of the nanostructured material showing its coral reef morphology.

The examples below are intended to further illustrate the nanostructured material and provide protocols for preparing, and uses thereof, and are not intended to limit the scope of the claims.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

The term "alkyl," as used herein, unless otherwise specified, refers to a saturated straight, branched, or cyclic, primary, secondary, or tertiary hydrocarbon of typically $C_1$ to $C_8$, and specifically includes methyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. The term optionally includes substituted alkyl groups. Moieties with which the alkyl group can be substituted are selected from the group consisting of hydroxyl, amino, halogen, alkylamino, arylamino, alkoxy, aryloxy, nitro, cyano, sulfonic acid, sulfate, phosphonic acid, phosphate, and phosphonate, either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The term "aryl," as used herein, and unless otherwise specified, refers to phenyl, biphenyl, or naphthyl, and preferably phenyl. The term includes both substituted and unsubstituted moieties. The aryl group can be substituted with one or more moieties selected from the group consisting of hydroxyl, amino, halogen, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991, hereby incorporated by reference in its entirety.

The term "heteroaryl," as used herein, refers to aromatic monocyclic, fused bicyclic, and fused tricyclic ring systems, wherein at least one atom is selected from the group consisting of oxygen, nitrogen, and sulfur. Heteroaryl groups include, but are not limited to, pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, thiophenyl, furanyl, quinolinyl, isoquinolinyl, benzoxazolyl, benzimidazolyl, and benzothiazolyl. The heteroaryl group can be substituted with one or more moieties selected from the group consisting of hydroxyl, amino, halogen, alkylamino, arylamino, alkoxy, aryloxy, nitro, cyano, sulfonic acid, sulfate, phosphonic acid, phosphate, and phosphonate, either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The term "arylalkyl," as used herein, refers to an aryl-substituted alkyl group, such as benzyl, phenethyl, and 1-naphthylethyl.

The term "ligand coordination complex" refers to a central atom or ion coordinated to one or more neutral molecules or ions.

The present disclosure is intended to include all isotopes of atoms occurring in the present compounds and complexes. Isotopes include those atoms having the same atomic number but different mass numbers. By way of general example and without limitation, isotopes of hydrogen include deuterium and tritium. Isotopes of carbon include $^{13}C$ and $^{14}C$. Isotopically-labeled compounds of the disclosure can generally be prepared by conventional techniques known to those skilled in the art or by processes analogous to those described herein, using an appropriate isotopically-labeled reagent in place of the non-labeled reagent otherwise employed. Unless otherwise stated, compounds in any hydration state may be used.

According to a first aspect, the present disclosure relates to a nanostructured material comprising Fe(II)/Fe(III) double hydroxide layers and an azo dye intercalated between the layers. The nanostructured material is in the form of a coral reef morphology having a plurality of nanoflake walls As defined here, a Fe(II)/Fe(III) double hydroxide layer is a positively-charged crystalline layer comprising hydroxide and both $Fe^{2+}$ and $Fe^{3+}$. One Fe(II)/Fe(III) double hydroxide layer comprises two levels of a planar hexagonally packed array of hydroxides where the lattice spacing parameter may be 0.29-0.33 nm, preferably 0.30-0.32 nm. The $Fe^{2+}$ and $Fe^{3+}$ ions exist in the space between the two levels, positioned so that each ion has the hydroxides at octahedral edges. The $Fe^{2+}$ and $Fe^{3+}$ ions may be distributed randomly or periodically across the various octahedral sites. Preferably, the $Fe^{3+}$ ions are located in octahedral sites that share edges with $Fe^{2+}$, but not with $Fe^{3+}$ ions. The Fe(II)/Fe(III) double hydroxide layer may have a similar structure to that of brucite (crystalline $Mg(OH)_2$), where the $Mg^{2+}$ is substituted by $Fe^{2+}$ and $Fe^{3+}$. Preferably the nanostructured material is ferromagnetic.

In one embodiment of nanostructured material, the Fe(II)/Fe(III) double hydroxide layers have a formula $[(Fe^{2+})_{1-x}(Fe^{3+})_x(OH^-)_2]^{x-}[(A^{n-})_{x/n}]^{x-} \cdot mH_2O$, where "x" is in the range of 0.05 to 0.50, "n" is in the range of 1 to 10, "m" is in the range of 0 to 10, and "A" is carbonate, hydroxide, chloride, nitrate, sulfate, phosphate, acetylacetonate, or an azo dye. In one embodiment the Fe(II)/Fe(III) double hydroxide layer may be similar to fougerite and/or green rust, which are naturally occurring Fe(II)/Fe(III) double hydroxide layers.

In one embodiment, the Fe(II)/Fe(III) double hydroxide layers have an Fe(II) to Fe(III) molar ratio of 2:1-4:1, preferably 2.4:1-3.8:1, more preferably 2.8:1-3.2:1, even more preferably 2.9:1-3.1:1. In an alternative embodiment, the Fe(II)/Fe(III) double hydroxide has an Fe(II) to Fe(III) molar ratio of 1:2-2:1.

In one embodiment, adjacent Fe(II)/Fe(III) double hydroxide layers may be part of a rhombohedral stacking pattern, thus giving the nanoflake walls a rhombohedral lattice crystal structure. Here, adjacent layers may have a stacking sequence of AcBiBaCjCbAk . . . where A, B, C each denote a planar hexagonal array of OFF; a, b, c each denote a planar array of Fe(II) and Fe(III); and i, j, k each denote the interlayer space, which may contain intercalated azo dye and/or other intercalated molecules. A rhombohedral stacking pattern of adjacent layers may furthermore be a 3R polytype. In another embodiment, adjacent layers may be part of a hexagonal stacking pattern, thus giving the nanoflake walls a hexagonal lattice crystal structure. Here, adjacent layers may have a stacking sequence of AcBiBaAjAcBk . . . using the notation as mentioned previously. In these embodiments of rhombohedral and hexagonal lattice crystal structures, the azo dye and/or other intercalating molecules may not be positioned in a geometric array. In one embodiment, a single nanostructured material may contain layers positioned with one or more stacking patterns. For instance, some nanoflake walls may comprise a hexagonal lattice crystal structure while other nanoflake walls comprise a rhombohedral stacking pattern. In some cases, a single nanoflake wall may comprise different stacking patterns. In one embodiment, a variety of lattice crystal structures and/or layer spacings of a single nanostructured material enables the intercalation of a wide range of compounds.

In one embodiment, the double hydroxide layer may comprise metal ions other than, or in addition to $Fe^{2+}$ and/or $Fe^{3+}$. These metals may be $Mg^{2+}$, $Ca^{2+}$, $Mn^{2+}$, $Co^{2+}$, $Ni^{2+}$, $Cu^{2+}$, $Zn^{2+}$, $Cd^{2+}$, $Al^{3+}$, $Mn^{3+}$, $Cr^{3+}$, $SC^{3+}$, $Ga^{3+}$, $La^{3+}$, $V^{3+}$, $Sb^{3+}$, $Y^{3+}$, $In^{3+}$, $Co^{3+}$ and/or $Ni^{3+}$. In an , alternative embodiment, the double hydroxide layer may comprise monovalent and/or tetravalent metal ions, such as $Li^+$, $Ti^{4+}$, or $Zr^{4+}$. In a related embodiment, the nanostructured material may comprise other layered double hydroxides, which may be synthetic or similar to naturally-occurring layered double hydroxides and intercalated with different anions. Naturally-occurring layered double hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougèrite group (fougèrite, trèbeurdenite, or mössbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered double hydroxide, such as coalingite, brugnatellite, or muskoxite.

As mentioned previously, in one embodiment the nanoflake walls comprise an azo dye intercalated between the at least two adjacent Fe(II)/Fe(III) double hydroxide layers. Here, an azo dye is defined as a molecular compound having at least one azo functional group of the form R—N=N—R' where R and R' comprise one or more awl, heteroaryl, or alkylaryl groups, and are preferably involved in 7c-electron delocalization with the azo group.

The azo dye may be an acid dye, such as an Acid Red, an Acid Orange, an Acid Brown, an Acid Violet, or an Acid Black dye; a basic dye, such as a Basic Brown, a Basic Orange, a Basic Red, or a Basic Yellow dye; a direct dye, such as a Direct Black, a Direct Blue, a Direct Brown, a Direct Green, a Direct Orange, a Direct Red, a Direct Violet, or a Direct Yellow; a disperse dye, such as a Disperse Orange, a Disperse Red, or a Disperse Yellow; a solvent dye, such as a Solvent Orange or a Solvent Red; a mordant dye, such as a Mordant Yellow or a Mordant Red; a pigment dye, such as a Pigment Red or a Pigment Yellow; an azoic diazo component dye; Citrus Red 2; Congo Red; hydroxynaphthol blue; methyl red; Janus Green B; trypan blue; calconcarboxylic acid; methyl orange; methyl yellow; Evans Blue; azobenzene; or some other azo dye. In an alternative embodiment, an aromatic azo compound that is not necessarily used as a dye, such as sulfamidochrysoidine (prontosil), may be intercalated. In one embodiment, the azo dye is calconcarboxylic acid, which may also be known as 3-hydroxy-4-(2-hydroxy-4-sulfo-1-naphthylazo)-2-naphthalenecarboxylic acid or Patton-Reeder indicator.

In an alternative embodiment, an azo compound having the formula R—N=N—R' may be intercalated where R and/or R' is not an aryl, heteroaryl, or alkylaryl group. For example, R and/or R' may be an alkyl group (substituted or unsubstituted), a hydrogen, a carbonamide group, a cycloalkyl group, a carboxyl group, or some other functional group. In another alternative embodiment, a sulfonic acid may be substituted for the azo dye, or intercalated along with the azo dye. As defined here, sulfonic acids are molecules with the formula R'''—S(=O)$_2$—OH, where R''' is an alkyl, an aryl, a heteroaryl, or an alkylaryl group. Examples of sulfonic acids include, but are not limited to, calmagite, sodium dodecylbenzenesulfonate (SDS), calconcarboxylic acid, 2-hydroxy-4-methoxybenzophenone-5-sulfonic acid, and perfluorooctan esulfoni c acid (PFOS).

In one embodiment, an azo dye may be intercalated along with other anions or neutral molecules that are not azo dyes. For instance, the azo dye may be intercalated along with water, $CO_3^{2-}$, $C_2O_4^{2}$, $OH^-$, $Cl^-$, $NO^{3-}$, $SO_4^{2-}$, $SO_3^{2-}$, $SeO_4^{2-}$, $PO_4^{3-}$, $Fe(CN)_6^{3-}$, $I^-$, $F^-$, $Br^-$, $Cr_2O_7^{2-}$, $S^{2-}$, $Sb(OH)_6^-$, $TcO_4^-$, $ClO_4^-$, $ReO_4^-$, acetate, and/or acetylacetonate. In another embodiment, an azo dye may be intercalated with a wide class of different compounds such as pesticides, herbicides, arsenic compounds, and/or pharmaceutical compounds, including, but not limited to erythromycin, oxacillin, ofloxacin, amoxicillin, ampicillin, ciprofloxacin, sulfamethoxazole, 17-β estradiol, estriol, estrone, mestranol, aspirin, diclofenac, ibuprofen, acetaminophen, indomethacin, metoprolol, propranolol, atenolol, enalapril, losartan, furosemide, diltiazem, carbamazepine, primidone, phenytoin (Dilantin), phenobarbital, fluoxetine, paroxetine, diazepam, meprobamate, bezafibrate, clofibric acid, gemfibrozil, and simvastatin. Biomolecules may also be intercalated, such hormones, enzymes, or DNA.

In one embodiment of the nanostructured material, the Fe(II)/Fe(III) double hydroxide layers have a basal spacing of 1.7-2.3 nm, preferably 1.8-2.2 nm, more preferably 1.9-2.1 nm. As defined here, the basal spacing between two layers is the distance from a metal ion within one layer to the closest metal ion in an adjacent layer, and is the spacing determined by X-ray diffraction. Preferably at least two adjacent layers are held together by hydrogen bonding through the hydroxides or by intermolecular attraction involving water and/or other intercalating molecules. The nanostructured material may comprise layers with different basal spacing, or two adjacent layers may be non-parallel and have different basal spacing throughout. For example, two adjacent layers may have a region with a 1.9 nm basal spacing, and a region with a 0.8 nm basal spacing. Basal spacings of 0.5-1.7 nm, 2.3-5 nm, or greater than 5 nm, may be possible between adjacent layers of the nanostructured material.

In one embodiment, the basal spacing may change by a measureable amount among different intercalating molecules. In another embodiment, the basal spacing may not change noticeably with different intercalating molecules. In another embodiment, the basal spacing may change across different solvents and/or different temperatures. The basal spacing may be measured by X-ray diffraction, TEM, or other techniques.

In one embodiment, not every two adjacent layers may have intercalated azo dye. For instance, azo dye may only be intercalated within 5-90%, or 30-80% or 40-60% of possible intercalation sites. In another embodiment, depending on the synthesis technique, azo dye may intercalate in more than 90%, or more than 95%, of possible intercalation sites. Where azo dye is present in less than 100% of possible intercalation sites, the remaining sites may be empty, or the remaining sites may be occupied by water, a previously-listed anion, and/or a previously-listed neutral molecule. In another embodiment, azo dye may be adsorbed to an outer surface of the layer. In another embodiment, the total azo dye intercalated and/or adsorbed to a nanostructured material may be 1-60%, preferably 5-30%, more preferably 5-20% of the combined mass.

According to the first aspect, the nanostructured material is in the form of a coral reef morphology having a plurality of nanoflake walls, as mentioned previously. Here, the nanoflake walls have a thickness of 2-50 nm, preferably 5-45 nm, more preferably 10-35 nm, and each nanoflake may have a longest dimension of 40 nm -5 µm, preferably 50 nm-3 µm, more preferably 100 nm-1 µm. Preferably the nanoflake walls have a high surface area to volume ratio, for example, greater than 0.2 $nm^{-1}$, preferably greater than 0.3 $nm^{-1}$, more preferably greater than 0.5 $nm^{-1}$. The nanoflake walls may also be known as platelets, nanoplatelets, or sheets, and the largest surfaces of the nanoflake walls may be shaped as parallelograms, hexagons, triangles, ellipses, or may have some other shape with straight, curved, and/or jagged edges.

As defined here, the coral reef morphology refers to hemispherical branched structures with diameters of 0.5-2 µm, preferably 0.7-1.8 µm, where the branches comprise connected nanoflake walls. Also defined here, a nanostructured material having a coral reef morphology means that hemispherical branched structures make up at least 60 mass % of the nanostructured material, with the remaining structure comprising disjointed nanoflake walls, particles, sheets, or other shapes. The hemispherical branched structures of the nanostructured material may resemble elkhorn coral (Acropora palmata) or other corals that have an overall rounded shape and flat branches. However, any two adjacent nanoflake walls, either directly connected or unconnected with each other, may occupy different geometric planes. Alternatively, the hemispherical branched structures may be described as nanoflowers, with the nanoflake walls as the petals. In one embodiment the average maximum distance between adjacent nanoflake walls is 70-120 nm, preferably 75-115 nm, more preferably 80-110 nm. In one embodiment, the nanoflake walls are connected to at least one other nanoflake wall, preferably at the edges, though in some cases the edge of one nanoflake wall may be connected to the face of another nanoflake wall. Nanoflake walls may also be connected to sheets and other surface features of the nanostructured material, through edges and/or faces.

Figure 1B:
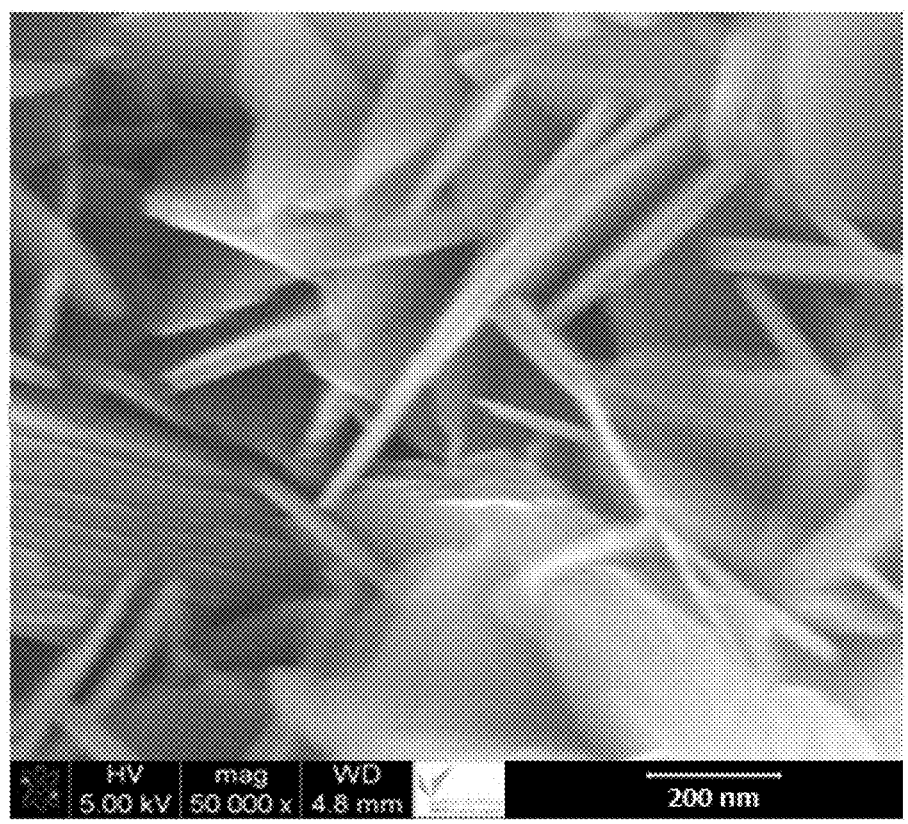
FIG. 1B is a zoomed-in SEM image of the nanostructured material showing the nanoflake walls.

FIG. 1A shows a TEM image of the nanostructured material showing the coral reef morphology and other morphologies, such as sheets. FIG. 1B shows a zoomed-in view of the nanostructured material to highlight the arrangement of the nanoflake walls of a single hemispherical branched structure.

As in FIG. 1A, the nanostructured material may form both the coral reef morphology and other morphologies. FIG. 1A shows the existence of larger sheets, with lengths of 1.5-2.5 µm and widths of 0.5-2 µm. These sheets may have the same thicknesses as the nanoflake walls, such as 2-50 nm, preferably 5-45 nm, more preferably 10-35 nm. A nanostructured material comprising both hemispherical branched structures and sheets may have a mass ratio of hemispherical branched structures to sheets that is 10:1-1:2, preferably 5:1-1:1. In other embodiments, the nanostructured material may have branched structures with an overall hemispherical shape and diameters of 0.5-2 µm, but with round branches, rather than flat branches made of connected nanoflake walls. In another embodiment, the nanostructured material may comprise nanoflake walls stacked on top of one another, rather than nanoflake walls connected in a branching configuration. In other embodiments, the nanoflake walls or sheets may have holes or pores. FIG. 1A shows sheets with holes having a longest dimension of 400-600 nm and a shortest dimension of 5-10 nm, although larger or smaller holes or pores may be possible. A single nanoflake wall or sheet of the nanostructured material may have a smooth surface, defined here as having a surface roughness, $R_a$, of 0.2 nm or less, where $R_a$ is defined by the absolute average deviation from the mean line of surface height (or depth) across the longest dimension of the nanoflake wall or sheet, where $R_a$=0 denotes a smooth, planar surface. Alternatively a single nanoflake wall or sheet may have a surface roughness of $R_a$=0.2-1 nm, or greater than 1 nm.

In an alternative embodiment, the nanostructured material may comprise nanoflake walls and sheets of previously mentioned shapes and dimension, but are not attached to one another. Alternatively, there may be a distribution of connected and unconnected nanoflake walls and sheets, for instance, any nanoflake wall may connect with an average of two other nanoflake walls.

In one embodiment, intercalation of one or more molecules may or may not change the interlayer spacing of the nanostructured material. In another embodiment, the intercalation of one or more molecules may or may not change the morphology of the nanostructured material. Preferably, the intercalating agent has no morphological effect on the nanostructured material.

In one embodiment, the entire nanostructured material may comprise hemispherical branched structures connected to each other through a meshwork of nanoflake walls. This entire nanostructured material may have a longest dimension of 10 µm-1 cm, preferably 20 µm-5 mm, more preferably 50 µm-1 mm, though in some embodiments, larger sizes may be possible. In another embodiment, the nanostructured material may comprise hemispherical branched structures that are not connected with one another. In an alternative embodiment, the nanostructured material may be attached to a substrate, such as a silica particle or a magnet.

According to a second aspect, the present disclosure relates to a method for producing the nanostructured material of the first aspect. In one embodiment, a ferrous ligand coordination complex, a ferric ligand coordination complex, and an alkylamine may be mixed to form a first mixture. The first mixture may contain the ferrous ligand coordination complex at a concentration of 10-40 mM, preferably 15-35 mM, more preferably 20-30 mM, and the ferric ligand complex at a concentration of 1-25 mM, preferably 3-20 mM, more preferably 6-12 mM. The ferrous ligand coordination complex may be Fe(II) acetylacetonate, a ferrocene, potassium hexacyanoferrate(II) trihydrate, tricarbonyl(cyclooctatetraene)iron(II), vinylferrocene, iron(II) oxalate, iron(II) gluconate dihydrate, iron(II) fumarate, iron(II) ascorbate, iron(II) lactate hydrate, ammonium iron(II) sulfate hexahydrate, and/or some other coordination complex of $Fe^{2+}$. The ferric ligand coordination complex may be iron(III) trifluoroacetylacetonate, potassium hexacyanoferrate(III), iron(III) tartrate, iron(III) chloride hexahydrate, iron(III) acetylacetonate, ammonium iron(III) sulfate dodecahydrate, and/or some other coordination complex of $Fe^{3+}$. In one embodiment, the ferrous ligand coordination complex is ferrous acetylacetonate, and the ferric ligand coordination complex is ferric acetylacetonate. In an alternative embodiment, salts of $Fe^{2+}$ and/or $Fe^{3+}$ may be used, such as iron(II) chloride, iron (II) bromide, iron (II) fluoride, iron (III) chloride, iron (III) bromide, iron (III) fluoride, iron(III) nitrate, and/or some other salt of $Fe^{2+}$ and/or $Fe^{3+}$. In one embodiment, the molar ratio of the ferrous ligand coordination complex and the ferric ligand coordination complex in the first mixture is 2:1-4:1, preferably 2.5:1-3.7:

1, more preferably 2.8:1-3.2:1, and in one preferred embodiment, the molar ratio may be 3:1.

In one embodiment, the alkylamine comprises at least one amine and 8-30 carbon atoms per molecule. Here, the alkylamine may be N,N-diisopropylethylamine, triisopropylamine, pentadecylamine, oleylamine, octadecylamine, dodecylamine, tetradecylamine, octylamine, hexadecylamine, or N-oleyl diethanolamide. In one embodiment the alkylamine is N-oleyl diethanolamide. In one embodiment, the alkylamine is the primary or only solvent of the first mixture. In another embodiment, other organic solvents may be used, such as ethanol, isopropanol, methanol, and/or acetone. The first mixture may be stirred or agitated for 10-90 minutes, preferably 20-60 minutes, more preferably 25-40 minutes, at a temperature of 35-55° C., preferably 40-50° C., more preferably 42-47° C. However, in one alternative embodiment, the first mixture may be left to sit without stirring and/or may be kept at room temperature for the previously mentioned amount of time.

An azo dye, water, an organic solvent, and an amine oxide may be mixed with the first mixture to form a second mixture. The azo dye may be an azo dye as previously listed, or a compound having a similar structure to that previously defined for an azo dye. In one embodiment, the azo dye is calconcarboxylic acid.

The water may be tap water, distilled water, bidistilled water, deionized water, deionized distilled water, reverse osmosis water, and/or some other water. In one embodiment the water is bidistilled to eliminate trace metals. Preferably the water is bidistilled, deionized, deinonized distilled, or reverse osmosis water and at 25° C. has a conductivity at less than 10 μS·cm¹, preferably less than 1 μS·cm¹, a resistivity greater than 0.1 MΩ·cm, preferably greater than 1 MΩ·cm, more preferably greater than 10 MΩ·cm, a total solid concentration less than 5 mg/kg, preferably less than 1 mg/kg, and a total organic carbon concentration less than 1000 μg/L, preferably less than 200 μg/L, more preferably less than 50 μg/L.

In one embodiment, a solution of an azo dye may be prepared by mixing a solid azo dye with the water and an organic solvent to form an azo dye solution. The organic solvent may be any of those previously listed, or may be a mixture of one or more organic solvents. In one embodiment, the azo dye is mixed to a concentration of 1-10 g/L, preferably 2-8 g/L, more preferably 3-7 g/L in a solution of water and 30-80 vol %, preferably 40-70 vol %, more preferably 45-55 vol % organic solvent. In one embodiment, this organic solvent is acetone. The solution of azo dye may then be mixed with the first mixture to an azo dye concentration of 0.5-5 g/L, preferably 1-4 g/L, more preferably 1.5-3 g/L, and may be stirred or agitated for 5-60 minutes, preferably 10-30 minutes, more preferably 12-25 minutes, at a temperature of 35-55° C., preferably 40-50° C., more preferably 42-47° C. However, in one embodiment, the solution of azo dye is mixed to form a homogenous mixture, without further stirring or agitating. Then, the amine oxide may be mixed in increments to reach a pH of 9-11, preferably 9.5-10.5. The amine oxide may be added directly as a solid, or may be added in the form of an aqueous solution that has an amine oxide concentration of 0.1-2 M, preferably 0.25-1 M, more preferably 0.4-0.6 M. Where the amine oxide is added as an aqueous solution, it may be added dropwise while mixing and monitoring the pH. However, in an alternative embodiment, the amine oxide may be added without monitoring the pH. In another alternative embodiment, a different compound may be used to adjust the pH with or without the amine oxide present. This compound may be sodium citrate, ammonia, sodium carbonate, sodium acetate, or some other basic compound.

The amine oxide may be a compound having the structure $R_1R_2R_3N^+$—$O^-$ where $R_1$, $R_2$, and $R_3$ may be alkyl groups and/or hydrogens attached to the $N^|$. Examples of amine oxides include, but are not limited to, myristamine oxide, N,N-dimethyldodecylamine N-oxide, N-lauryldiethanolamine N-oxide, N,N-dimethylpropylamine N-oxide, N,N-diethylpropylamine N-oxide, triethylamine N-oxide, trimethylamine N-oxide, and/or tripropylamine oxide. In one embodiment, the amine oxide is trimethylamine N-oxide (TMAO).

In another embodiment, the azo dye may be mixed directly with the first mixture, and the organic solvent, water, and the amine oxide may be mixed in separately to form the second mixture, using the previously mentioned amounts for each component. In another embodiment, the components may be mixed in a different order, for example, the organic solvent, water, and the amine oxide may be mixed with the first mixture, and then the azo dye may be mixed to form the second mixture.

The second mixture may be heated to form a precipitate. In one embodiment, the second mixture is heated to 150-250° C., preferably to 175-225° C., more preferably to 190-220° C. In a preferred embodiment, the second mixture is heated to 200° C. The mixture may be heated at the previously mentioned temperature for 10-60 minutes, preferably 15-40 minutes, more preferably 20-30 minutes, and may or may not be stirred or agitated. In one embodiment, the second mixture is heated using a microwave with a power of 100-300 W, preferably 150-250 W, though in other embodiments, the second mixture may be heated using a hot plate or some other heating element. The second mixture may be heated at atmospheric pressure, or may be heated at higher pressures, such as by heating in a closed vessel or autoclave. After heating, the second mixture may be left to sit at room temperature for 0.5-3 hours, preferably 1-2 hours, in order to reach 18-27° C., preferably 20-25° C. Alternatively, the second mixture may be cooled by water tubing, a water and/or ice bath, ice packs, or air cooling.

Figure 10:
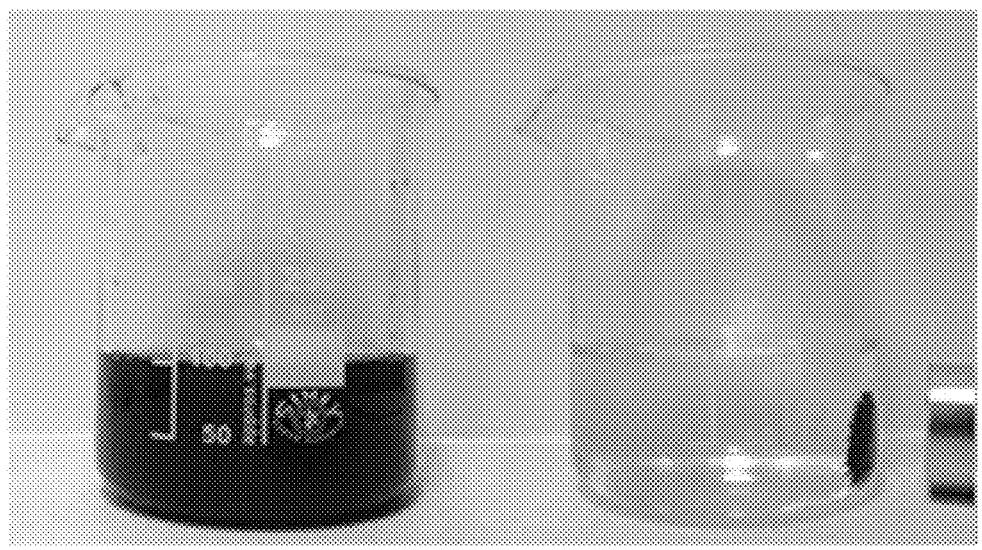
FIG. 10 shows the magnetic separation of the nanostructured material from the solution after the adsorption process.

As mentioned, a precipitate may form in the second mixture. This precipitate may be filtered from the solution, or removed from the solution using a magnet. The precipitate may be filtered using a paper filter, a glass frit, or a semi-permeable membrane, though in an alternative embodiment, the precipitate may be recovered by evaporating the solution, for example, in a Rotavap. The precipitate may be washed with water and an organic solvent, which water and organic solvent may be those previously listed, and then dried at a temperature of at least 60° C., preferably at least 70° C., more preferably at least 75° C. for 2-24 hours, preferably 6-16 hours, more preferably 8-12 hours, to form the nanostructured material. The precipitate may be dried at ambient air pressure or may be dried under vacuum. In an alternative embodiment, the precipitate may be dried without heating, such as in a desiccator and with or without a vacuum. In another embodiment, the precipitate may be washed with an organic solvent, such as ethanol, without washing with water. In an alternative embodiment, the precipitate may be filtered or removed from the solution and then dried without any washing.

Where a magnet is used to separate the precipitate or the nanostructured material from a solution, the magnet may comprise magnetite ($Fe_3O_4$), ferrite alloy (also known as ceramic magnets, such as $BaFe_2O_3$, $BaFe_{12}O_{19}$, $ZnFe_2O_4$, $SrFe_2O_3$, or $SrFe_{12}O_{19}$), neodymium alloy (such as $Nd_2Fe_{14}B$, bonded or sintered), samarium alloy (such as $SmCo_5$, $SmCo_7$, $Sm_2Co_{17}$, $SmFe_7$, $Sm_2Fe_{17}$, $SmCu_7$, $Sm_2Cu_{17}$, $SmZr_7$, $Sm_2Zr_{17}$, $SmHf_7$, $Sm_2Hf_{17}$, $SmPr_7$, or $Sm_2Pr_{17}$), Alnico, or any combination thereof Alternatively, the magnet may be an electromagnet. The magnet may have a residual flux density ($Br_{max}$) of 0.1-2.0 T, preferably 1.0-1.5 T, more preferably 1.1-1.4 T, and a magnetic field strength of 2 mT15 T, preferably 4 mT10 T, more preferably 5 mT5 T as measured from any exterior surface of the magnet. The magnet may be plated with nickel or coated with another substance such as glass or Teflon. The magnet may be placed directly into the solution containing the precipitate or nanostructured material, or may be placed on an exterior side of the vessel containing the precipitate or nanostructured material, as shown in FIG. 10. In one embodiment, a Teflon-coated magnetic stir bar may be used as the magnet.

According to a third aspect, the present disclosure relates to a method of using the nanostructured material to reduce a contaminant concentration in a solution. In one embodiment, the solution may be water before or after being treated for consumption or irrigation. Preferably, the solution is tap water, municipal water, or water from a public water system. In another embodiment, the solution may be waste water or treated waste water. In other embodiments, the solution may be from rainfall, ground water, a river, a pond, a lake, an ocean, snow melt, or some other natural source of water. Alternatively, the solution may be from a treated artificial body of water, such as a pool, fountain, bath, aquarium, or hot tub. In other embodiments, the solution may be an aqueous or organic solution in an industrial process and may not be destined for consumption, irrigation, or waste treatment. For example, the solution may be a surfactant solution used to manufacture a detergent.

The contaminant may be an herbicide, a fungicide, a pesticide, a pharmaceutical compound, a steroid, a microbial toxin, a metabolite, a disinfection byproduct, an arsenic-containing compound, a dye, or some other organic molecule. Preferably the contaminant is one or more unwanted compounds known to be persistent in treated water or as an environmental pollutant.

In one embodiment, the contaminant is a pharmaceutical compound selected from the group consisting of an antibiotic, a hormone, an anti-inflammatory, an antihypertensive, an anticonvulsant, an antidepressant and a lipid regulator. The antibiotic may be erythromycin, oxacillin, ofloxacin, amoxicillin, ampicillin, ciprofloxacin, sulfamethoxazole, clarithromycin, fidaxomicin, tetracycline, doxycycline, cephalexin, clindamycin, metronidazole, azithromycin, levofloxacin, or some other antibiotic. The hormone may be 17-β estradiol, estriol, estrone, mestranol, hydrocortisone, fludrocortisone, thyroxine, or some other hormone. The anti-inflammatory may be aspirin, diclofenac, ibuprofen, acetaminophen, indomethacin, ketoprofen, sulindac, naproxen, meloxicam, tolmetin, fluocinonide, diflorasone, dutasteride, amcinonide, clobestasol, or some other anti-inflammatory drug. The antihypertensive may be metoprolol, propranolol, atenolol, enalapril, losartan, furosemide, diltiazem, valsartan, terazosin, spironolactone, clonidine, bosentan, epitizide, or some other antihypertensive drug. The anticonvulsant may be carbamazepine, primidone, phenytoin (Dilantin), phenobarbital, clobazam, divalproex, lacosamide, vigabatrin, clonazepam, valproic acid or some other anticonvulsant drug. The antidepressant may be fluoxetine, paroxetine, diazepam, meprobamate, venlafaxine, sertfraline, citalopram, trazadone, duloxetine, doxepin, amoxapine, or some other antidepressant. The lipid regulator may be bezafibrate, clofibric acid, gemfibrozil, simvastatin, alirocumab, pravastatin, atorvastatin, colestipol, ezetimibe, mipomersen, lovostatin, or some other statin or lipid lowering drug. In other embodiments, the contaminant may be other types of pharmaceutical compounds, such as a stimulant, an anticoagulant, an antihistamine, an antiviral, an antipsychotic, a hypnotic, an analgesic, an anticholinergic, an antiarrhythmic, an antiplatelet, a bronchodilator, a beta-blocker, an angiotensin-converting enzyme (ACE) inhibitor, a sedative, a calcium antagonist, a vitamin, an antirheumatic, or some other pharmaceutical compound. In another embodiment, the contaminant may not be a pharmaceutical compound, but a degradation product or a metabolite of a pharmaceutical compound.

The contaminant may be present in the solution at a concentration of 50 mg/L-2 g/L, preferably 0.5 g/L-1.5 g/L, more preferably 0.9 g/L-1.2 g/L. However, in some embodiments the contaminant may be at concentrations below 50 mg/L or greater than 2 g/L. The nanostructured material may be added to a concentration of 0.5-100 mg/L, preferably 0.5-10 mg/L, more preferably 0.5-5 mg/L, though in other embodiments may be added to a concentration less than 0.5 mg/L or greater than 100 mg/L. The mass ratio between the contaminant and the nanostructured material may be 5,000:1-1:1,000, preferably 2,000:1 1:2, more preferably 1,500:1-10:1.

The nanostructured material may be mixed directly as a solid, or may be dispersed in a liquid, such as water, and mixed as a solution. The nanostructured material and contaminant solution may continue to be stirred or agitated, though in one embodiment, the solution may be left to sit. Preferably the nanostructured material reduces the contaminant concentration by adsorption. The nanostructured material may reduce the initial contaminant concentration by greater than 10%, preferably greater than 40%, more preferably greater than 70%. Preferably the contaminant may be adsorbed to an exterior surface of the nanostructured material or may be adsorbed in a pore, an interior surface, or intercalated within adjacent layers of the Fe(II)/Fe(III) double hydroxide. However, in one embodiment, an ion or atom from a contaminant solution may intercalate into a layer of a Fe(II)/Fe(III) double hydroxide, with or without displacing an Fe(II) or Fe(III). The nanostructured material may adsorb at least 1% of its mass of the contaminant, preferably at least 5%, more preferably at least 10%. In one embodiment, the nanostructured material may adsorb a mass of contaminant equal to or greater than the mass of the nanostructured material. For instance, the nanostructured material may adsorb a contaminant mass of at least 10 times, 100 times, or 1,000 times the nanostructured material mass. In one embodiment, 0.5-2 mg/L of nanostructured material in a 0.9 g/L-1.2 g/L contaminant solution is able to adsorb at least 90%, preferably at least 95% of the total contaminant by mass. In one embodiment, the nanostructured material may reach half of its final adsorption capacity in 1-40 minutes, preferably 2-30 minutes, more preferably 3-10 minutes after being placed in the contaminant solution. The reduction in contaminant concentration may be measured by spectroscopic, electrochemical, or gravimetric analysis of the solution, or by other means, such as by a colorimetric assay. In one embodiment, the contaminant concentration is measured by taking UV-Vis absorption measurements, preferably in the wavelength range $\lambda$=200-600 nm. Alternatively, the nanostructured material may be removed from the solution and analyzed to estimate the total amount of adsorbed contaminant.

According to a third aspect, the nanostructured material may be removed from the contaminant solution and reused in a second contaminant solution. Here, the nanostructured material may be removed from a contaminant solution after being in contact for at least 5 minutes, preferably at least 10 minutes, more preferably at least 30 minutes. The nanostructured material may be filtered from the contaminant solution, as mentioned previously, or removed with a magnet to produce a recovered nanostructured material.

The recovered nanostructured material may be washed as mentioned previously, and may then be mixed with an acidic solution. In one embodiment, this acidic solution comprises one or more inorganic acids at a total concentration of 0.2-1.0 M, preferably 0.3-0.8 M, more preferably 0.4-0.7 M. The inorganic acid may be a mineral acid such as hydrochloric acid, bromic acid, sulfuric acid, nitric acid, iodic acid, hydrofluoric acid, and/or some other inorganic acid. In an alternative embodiment, an organic acid, such as acetic acid, formic acid, propionic acid, benzoic acid, and/or butyric acid, may be used in place of the inorganic acid. In one embodiment, the acidic solution may comprise two acids, and the molar ratio between the two may be 10:1-1:10, preferably 2:1-1:2, more preferably 1.1:1-1:1.1. In a further embodiment, these two acids may be nitric acid and sulfuric acid. In a preferred embodiment, the acidic solution is made by mixing a 0.5 M nitric acid solution with a 0.5 M sulfuric acid solution at a 1:1 volume ratio. In one embodiment, any volume of acidic solution may be used to effectively contact all of the nanostructured material. Preferably, however, greater volumes of acidic solution may be used, especially where the nanostructured material may contain high amounts of adsorbed contaminants. The acidic solution may be mixed to a recovered nanostructured material concentration of 10 µg/L-100 µg/L, 100 µg/L-10 g/L, preferably 0.5-10 mg/L, more preferably 0.5-5 mg/L. However, in some embodiments, the recovered nanostructured material may be mixed with the acidic solution at higher concentrations, for instance, 20-70 g/L.

The recovered nanostructured material may be left in the acidic solution for 0.5-6 hours, preferably 1-5 hours, more preferably 1.5-3 hours. The recovered nanostructured material may be stirred or agitated while in the acidic solution, or may be left to sit unperturbed.

The acidic solution may be dried to produce a cleaned nanostructured material. Preferably the recovered nanostructured material may be removed from the acidic solution by filtering or with a magnet as previously described. The material may then be washed with water and left at room temperature to dry for 1-10 hours, preferably 1-5 hours, more preferably 2-4 hours to produce the cleaned nanostructured material. In other embodiments, the material may be washed with an organic solvent along with, or in place of, water. Alternatively, the material may be dried under vacuum or in a desiccator, with or without heating.

The cleaned nanostructured material may be mixed with the azo dye to produce a recharged nanostructured material. Preferably, the added azo dye intercalates or adsorbs to the nanostructured material in locations that were previously occupied by azo dye or adsorbed contaminant. Preferably the added azo dye is the same compound as that originally intercalated or adsorbed by the nanostructured compound before its addition to the contaminant solution, however, different azo dyes or other intercalating compounds, as mentioned previously, may be used.

In one embodiment, the cleaned nanostructured material is mixed with a solution of the azo dye to produce the recharged nanostructured material. The solution of azo dye may comprise water and an organic solvent at a volume ratio of 10:1-1:10, preferably 2:1-1:2, more preferably 1.1:1-1: 1.1. The organic solvent may be any of those mentioned previously; preferably the organic solvent is acetone. The solution of azo dye may comprise the azo dye at a concentration of 0.5-20 g/L, preferably 2-10 g/L, more preferably 3-8 g/L. In one embodiment, the azo dye and the cleaned nanostructured material may be mixed to a mass ratio of 50:1-200:1, preferably 70:1-150:1, more preferably 90:1-120:1. The cleaned nanostructured material and the solution of azo dye may be stirred or agitated for 5-60 minutes, preferably 10-40 minutes, more preferably 12-20 minutes, at a temperature of 35-55° C., preferably 40-50° C., more preferably 42-48° C. Alternatively, the cleaned nanostructured material and the solution of azo dye may be left to sit without stirring and/or may not be heated.

The recharged nanostructured material may be removed from the solution of azo dye and washed as previously described. This recharged nanostructured material may then be reused to decrease a contaminant concentration in another contaminant solution, following the methods as mentioned previously, and then repeatedly cleaned and reused. The recharged nanostructured material may be used to adsorb the same contaminant or a different contaminant. In one embodiment, where the nanostructured material did not adsorb all of a contaminant, the nanostructured material may be cleaned, recharged, and returned to the same contaminant solution. In an alternative embodiment, a recovered nanostructured material may not have reached its adsorption capacity after contact with a previous one or more contaminant solutions. Then, the recovered nanostructured material may be reused without treatment by the acidic solution and/or azo dye, as it is able to adsorb more contaminant until reaching its adsorption capacity.

In one embodiment, the recharged nanostructured material maintains its adsorption capacity for at least 10 purification cycles. Here, "maintains adsorption capacity" means that the ratio of the maximum adsorbed contaminant mass per mass of nanostructured material is at least 70%, preferably at least 80%, more preferably at least 90% of its initial value. A purification cycle refers to the adsorption of a contaminant on and/or intercalated within the nanostructured material, the subsequent cleaning of the nanostructured material to remove a portion or all of the contaminant, and the recharging of the nanostructured material with the azo dye. Preferably the recharged nanostructured material is able to maintain its adsorption capacity across different contaminants. In other embodiments, the recharged nanostructured material is able to maintain its adsorption capacity for at least 100 cycles, at least 1,000 cycles, at least 3,000 cycles, or even at least 5,000 cycles. In one embodiment, the nanostructured material is able to maintain its adsorption capacity for at least 10 purification cycles, or at least 100 purification cycles, without re-intercalating the azo dye.

Figure 11:
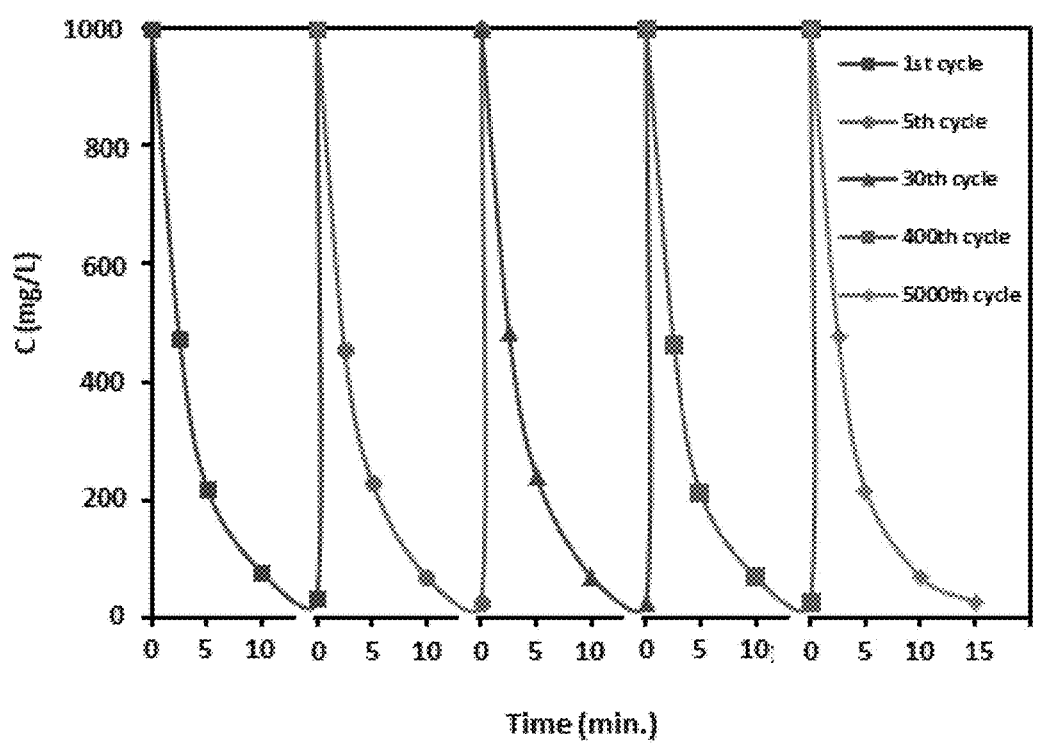
FIG. 11 shows the decrease of sulfamethoxazole concentrations for a nanostructured material being reused throughout several purification cycles.

Preferably in reusing the nanostructured material, all of it may be recovered after each purification cycle, enabling several cycles to be repeated with a single batch of nanostructured material. However, in some embodiments, 0.1-1 mass %, or 1-5 mass % may be lost with each cycle. Preferably the reuse of the nanostructured material does not change its morphology or other physical characteristics. For example, FIG. 11 shows the nanostructured material of FIG. 1A and 1B, after 5,000 purification cycles of 1 g sulfamethoxazole being adsorbed per 1 mg nanostructured material. From FIG. 11 it is evident that the morphology and dimensions of the nanostructured material do not change appreciably.

In an alternative embodiment, the nanostructured material may be fixed to a support and exposed to a flowing contaminant solution, where the nanostructured material then adsorbs a contaminant. The used nanostructured material may then be cleaned in place, optionally dried, and then recharged with azo dye while staying fixed to the support. Alternatively, the nanostructured material may not be fixed to a support, but confined within a permeable membrane or filter, allowing similar operation.

In an alternative embodiment, the nanostructured material may be intercalated not with an azo dye or a contaminant, but with a molecule destined for slow release. The slow release may occur by ion exchange. The slow release of a molecule from the nanostructured material may be used for drug delivery or to release fertilizer or nutrients to soil. Alternatively, the nanostructured material may be used as a phosphate binder drug. In another alternative embodiment, the nanostructured material, with or without intercalated azo dye, may be used outside of a solution to adsorb gaseous pollutants or other gaseous compounds.

The examples below are intended to further illustrate protocols for preparing and characterizing the nanostructured material, and uses thereof, and are not intended to limit the scope of the claims

EXAMPLE 1

Figure 2:
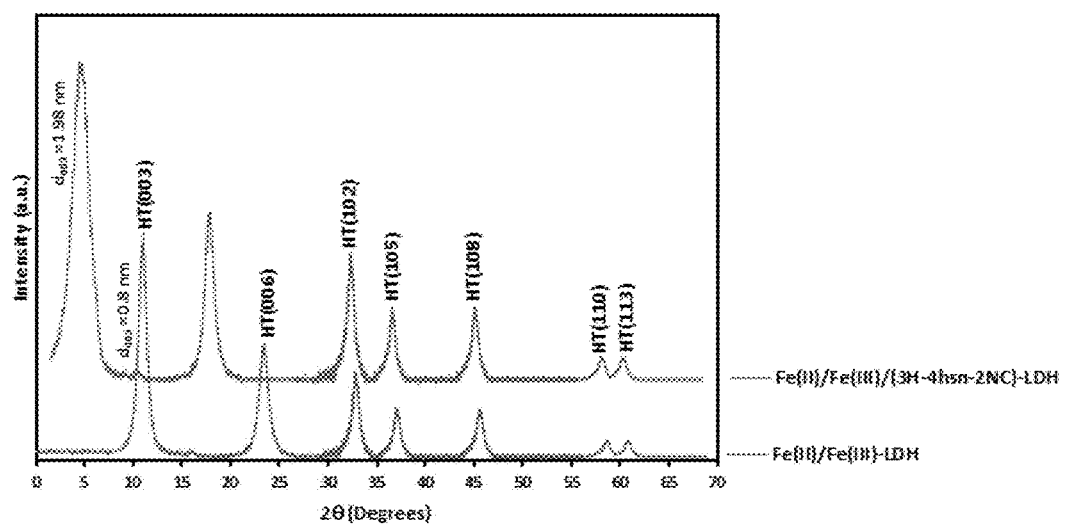
FIG. 2 shows the X-ray diffraction (XRD) patterns of the nanostructured material (Fe(II)/Fe(III)-LDH) with and without intercalated 3H-4hsn-2NC (calconcarboxylic acid).

Preparation of a Nanostructured Material Comprising Fe(II)/Fe(III) Double Hydroxide Layers in a Coral Reef Morphology and having a Plurality of Nanoflake Walls In a conical flask, 0.75 mmol of ferrous acetylacetonate and 0.25 mmol of ferric acetylacetonate were dissolved in 30 mL of 2,2'-(octadec-9-enylimino)bisethanol solution (also known as N-oleyl diethanolamide) and stirred for 30 minutes at 45° C. In a separate conical flask, a solution of 3-hydroxy-4-(2-hydroxy-4-sulfo-1-naphthylazo)-2-naphthalenecarboxylic acid (also known as calconcarboxylic acid) was prepared by dissolving 0.1 g of it into a 20 mL acetone solution having an acetone:water volume ratio of 1:1. This calconcarboxylic acid solution was added to the Fe(II)/Fe(III) solution and stirred for 15 minutes at 45° C. A 0.5 mM trimethylamine N-oxide solution was added dropwise to reach a pH of 10. The solution was poured into a 80 mL Teflon-lined autoclave and heated in a microwave oven (Sineo-Uwav-1000M) at a power of 200 W and temperature of 200° C. for 25 min. The solution was then left to cool down to room temperature. A precipitate that was formed in the solution was collected by filtration, washed with deionized water and ethanol, and dried at 80° C. for 10 h, and this precipitate is the nanostructured material. FIGS. 1A and 1B show SEM images of the nanostructured material, and FIG. 2 shows an XRD.

EXAMPLE 2

Adsorption of Antibiotic Drugs in Tap Water by the Nanostructured Material.

Figure 3:
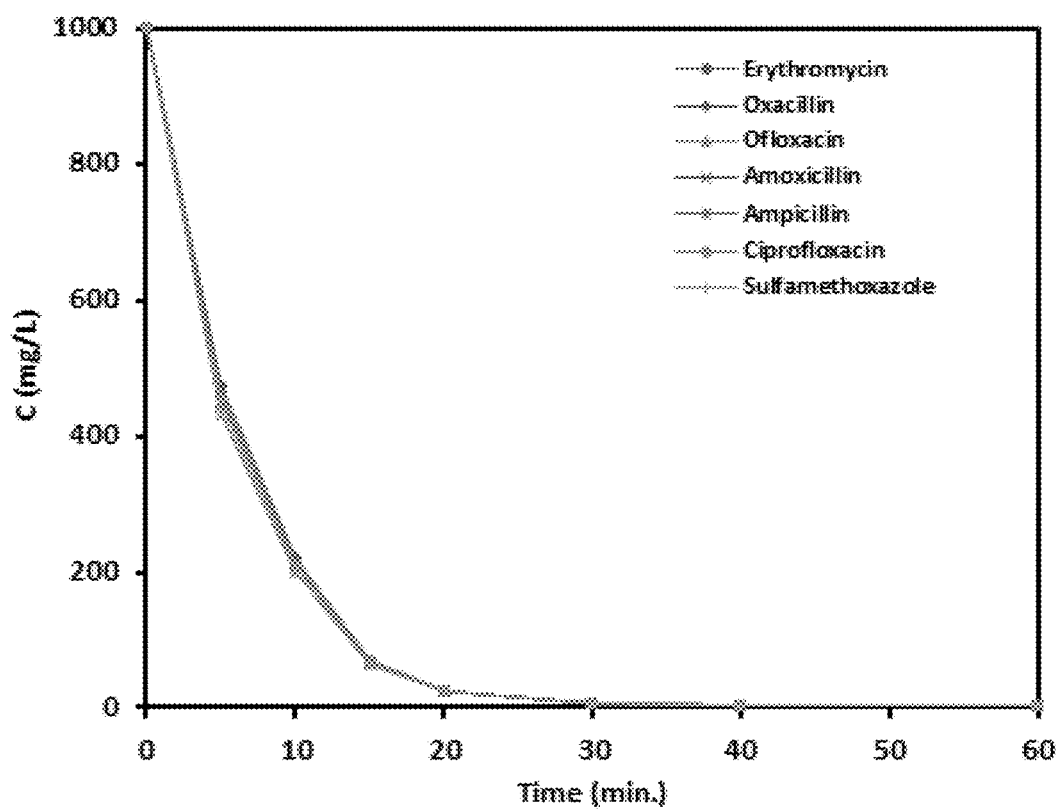
FIG. 3 shows the concentrations of various antibiotics in tap water being reduced by adsorption to the nanostructured material.

To determine how well the nanostructured material removes contaminants from tap water, its adsorption of pharmaceutical compounds was tested with solutions of the antibiotic drugs erythromycin, oxacillin, ofloxacin, amoxicillin, ampicillin, ciprofloxacin, and sulfamethoxazole. In each experiment 1000 mg/L of an antibiotic drug was dispersed in tap water. The tap water was used in order to simulate a real situation and was previously analyzed for pollutants. The initial solution conductivity was 775 mS/cm, and the pH was 7. A 1 mg of the nanostructured material was added to 1 L of the antibiotic drug solution. UV-visible absorption spectra of the antibiotic drug solution were measured by a spectrophotometer (JASCO-V-750) in the wavelength range $\lambda=200-600$ nm, before treatment and at various interval times. A plot showing the decreases in these antibiotic drug concentrations is shown in FIG. 3.

EXAMPLE 3

Adsorption of Hormone Drugs in Tap Water by the Nanostructured Material.

Figure 4:
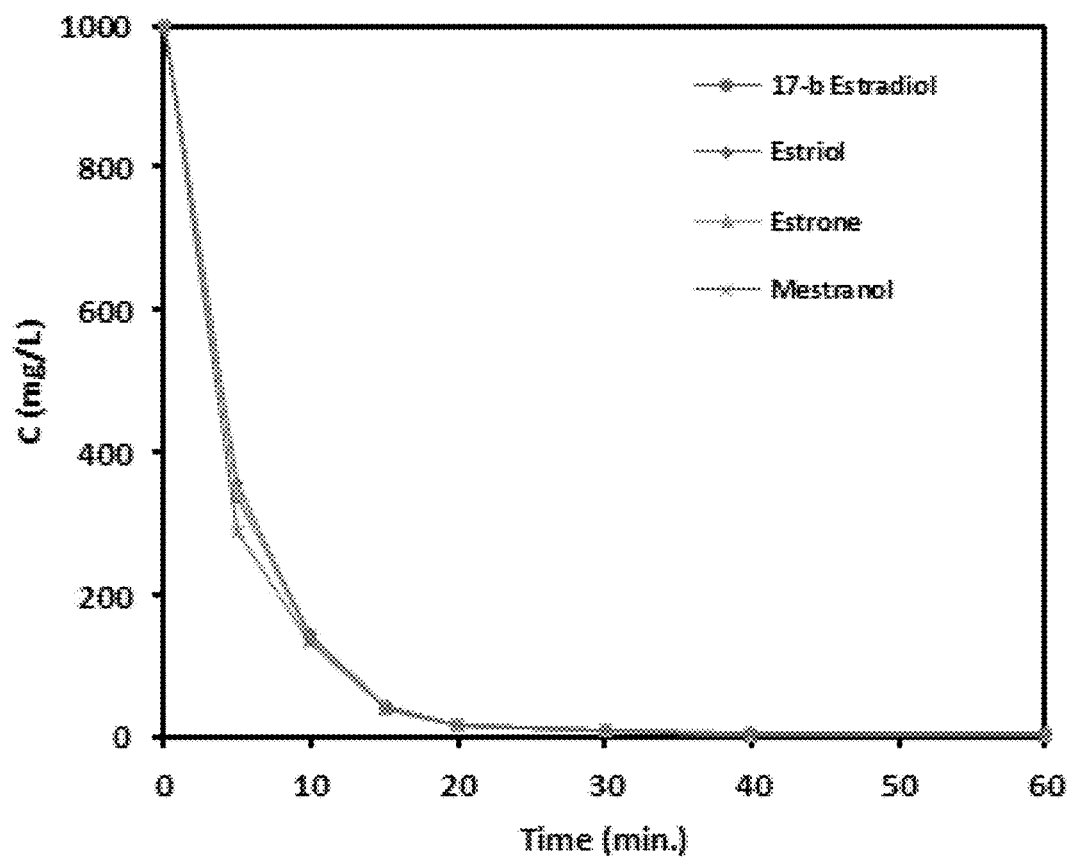
FIG. 4 shows the concentrations of various hormone drugs in tap water being reduced by adsorption to the nanostructured material.

The process of adsorbing hormone drugs from tap water was carried out under the same conditions as Example 2, except that the hormone drugs 17-β estradiol, estriol, estrone, and mestranol were used instead of antibiotic drugs. A plot showing the decreases in these hormone drug concentrations is shown in FIG. 4.

EXAMPLE 4

Adsorption of Anti-Inflammatory Drugs in Tap Water by the Nanostructured Material.

Figure 5:
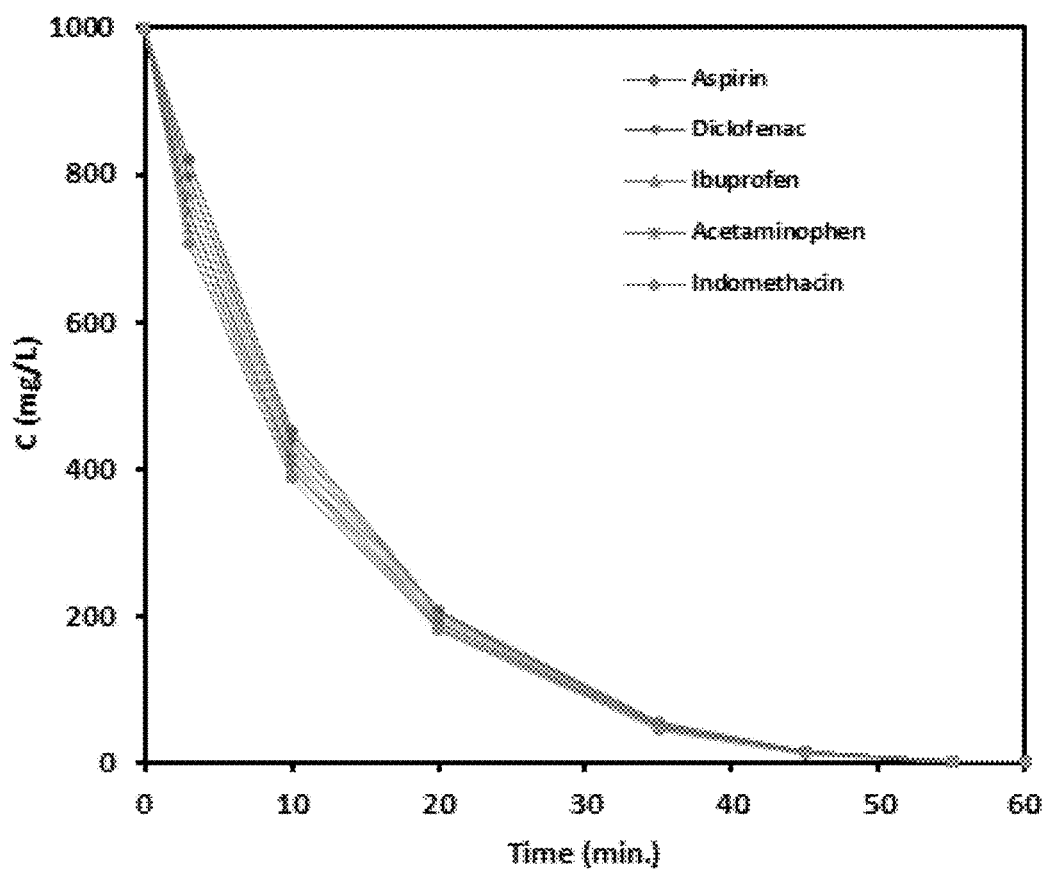
FIG. 5 shows the concentrations of various anti-inflammatory drugs in tap water being reduced by adsorption to the nanostructured material.

The process of adsorbing anti-inflammatory drugs from tap water was carried out under the same conditions as Example 2, except that the anti-inflammatory drugs aspirin, diclofenac, ibuprofen, acetaminophen, and indomethacin were used instead of antibiotic drugs. A plot showing the decreases in these anti-inflammatory drug concentrations is shown in FIG. 5.

EXAMPLE 5

Adsorption of Antihypertensive Drugs in Tap Water by the Nanostructured Material.

Figure 6:
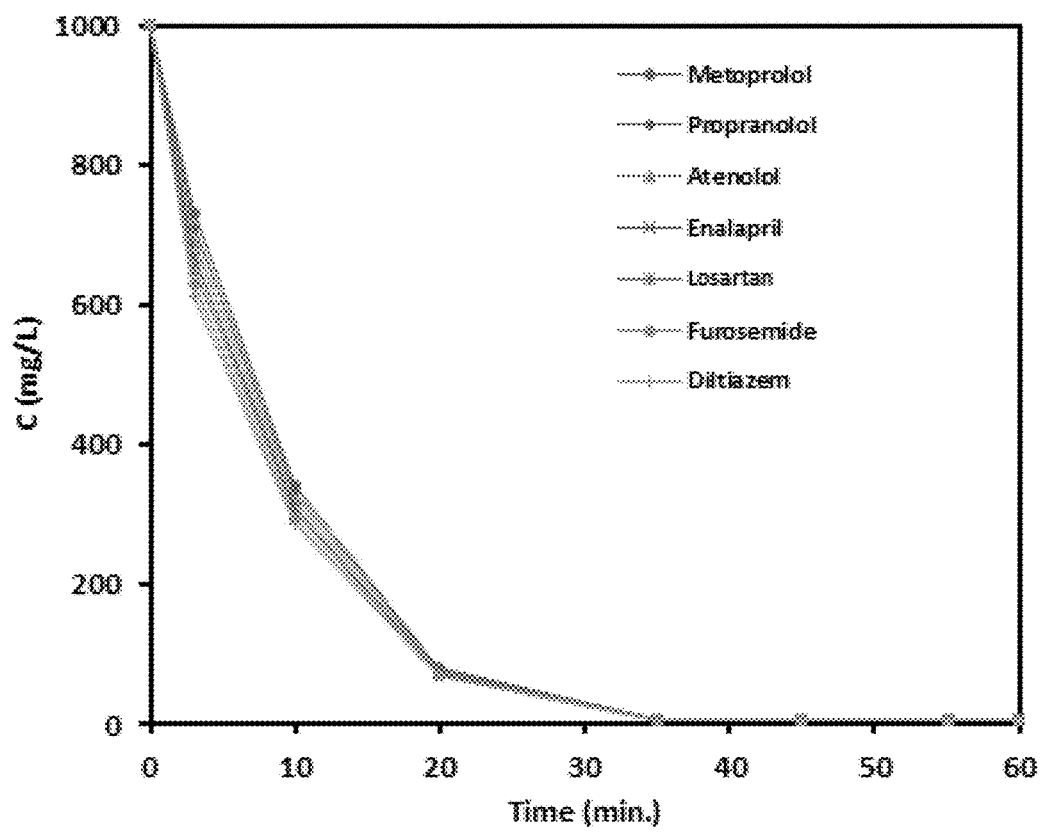
FIG. 6 shows the concentrations of various antihypertensive drugs in tap water being reduced by adsorption to the nanostructured material.

The process of adsorbing antihypertensive drugs from tap water was carried out under the same conditions as Example 2, except that the antihypertensive drugs metoprolol, propranolol, atenolol, enalapril, losartan, furosemide, and diltiazem were used instead of antibiotic drugs. A plot showing the decreases in these antihypertensive drug concentrations is shown in FIG. 6.

EXAMPLE 6

Adsorption of Anticonvulsant Drugs in Tap Water by the Nanostructured Material.

Figure 7:
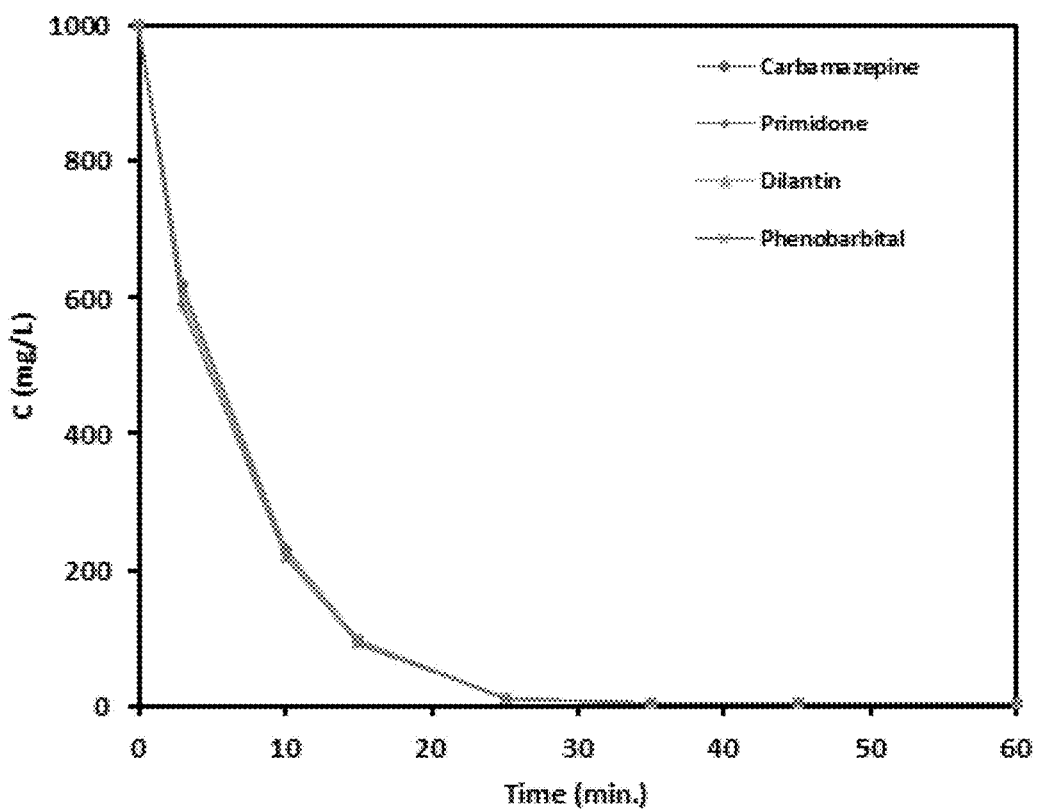
FIG. 7 shows the concentrations of various anticonvulsant drugs in tap water being reduced by adsorption to the nanostructured material.

The process of adsorbing anticonvulsant drugs from tap water was carried out under the same conditions as Example 2, except that the anticonvulsant drugs carbamazepine, primidone, phenytoin (Dilantin), and phenobarbital were used instead of antibiotic drugs. A plot showing the decreases in these anticonvulsant drug concentrations is shown in FIG. 7.

EXAMPLE 7

Adsorption of Antidepressant Drugs in Tap Water by the Nanostructured Material.

Figure 8:
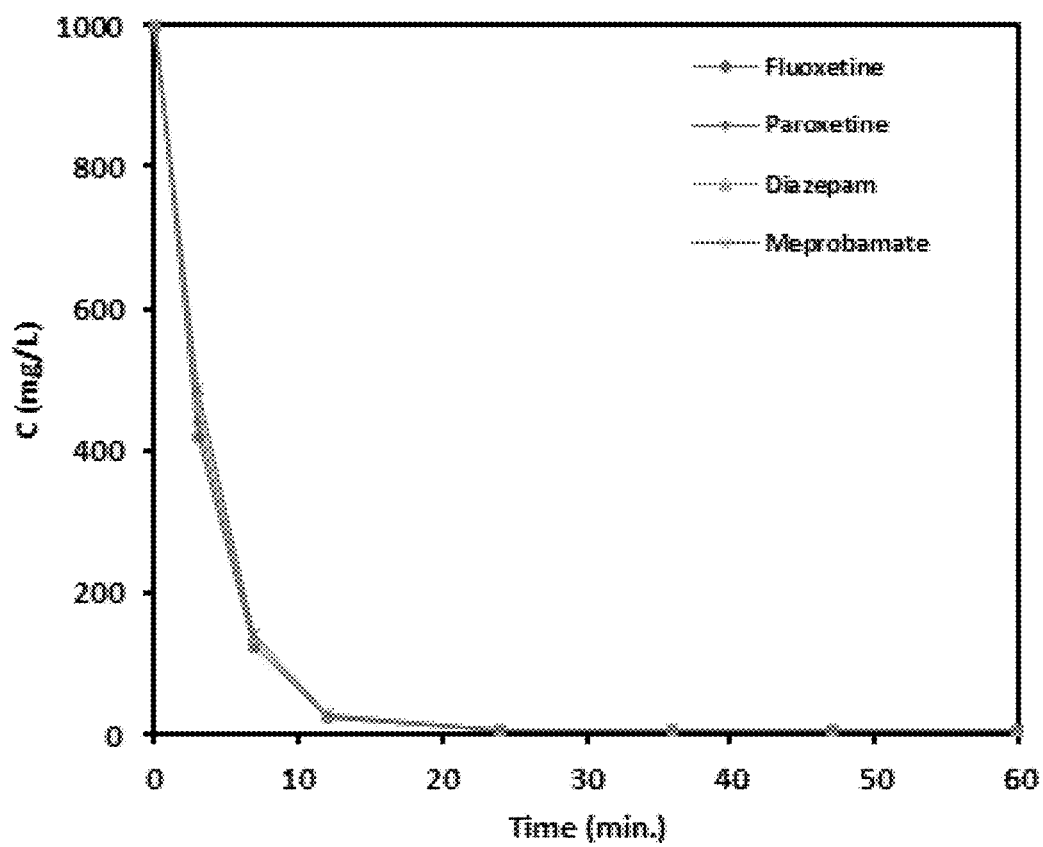
FIG. 8 shows the concentrations of various antidepressants in tap water being reduced by adsorption to the nanostructured material.

The process of adsorbing antidepressant drugs from tap water was carried out under the same conditions as Example 2, except that the antidepressant drugs fluoxetine, paroxetine, diazepam, and meprobamate were used instead of antibiotic drugs. A plot showing the decreases in these antidepressant drug concentrations is shown in FIG. 8.

EXAMPLE 8

Adsorption of Lipid Regulator Drugs in Tap Water by the Nanostructured Material.

Figure 9:
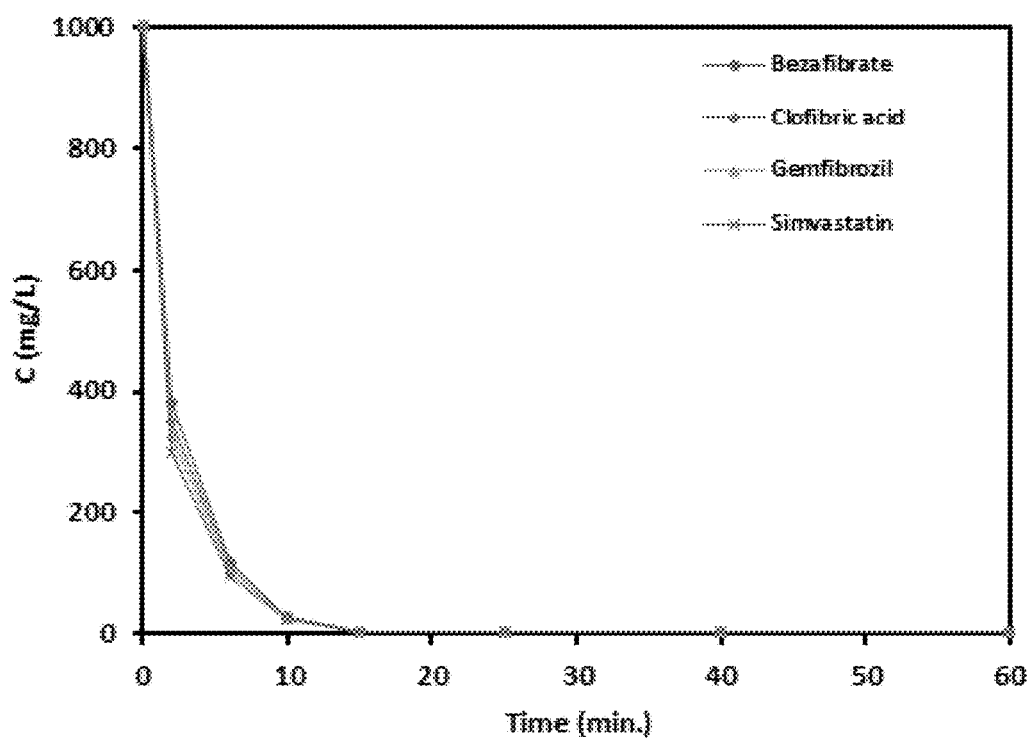
FIG. 9 shows the concentrations of various lipid regulators in tap water being reduced by adsorption to the nanostructured material.

The process of adsorbing lipid regulator drugs from tap water was carried out under the same conditions as Example 2, except that the lipid regulator drugs bezafibrate, clofibric acid, gemfibrozil, and simvastatin were used instead of antibiotic drugs. A plot showing the decreases in these lipid regulator drug concentrations is shown in FIG. 9.

EXAMPLE 9

The Cleaning and Reuse of the Nanostructured Material.

Figure 12:
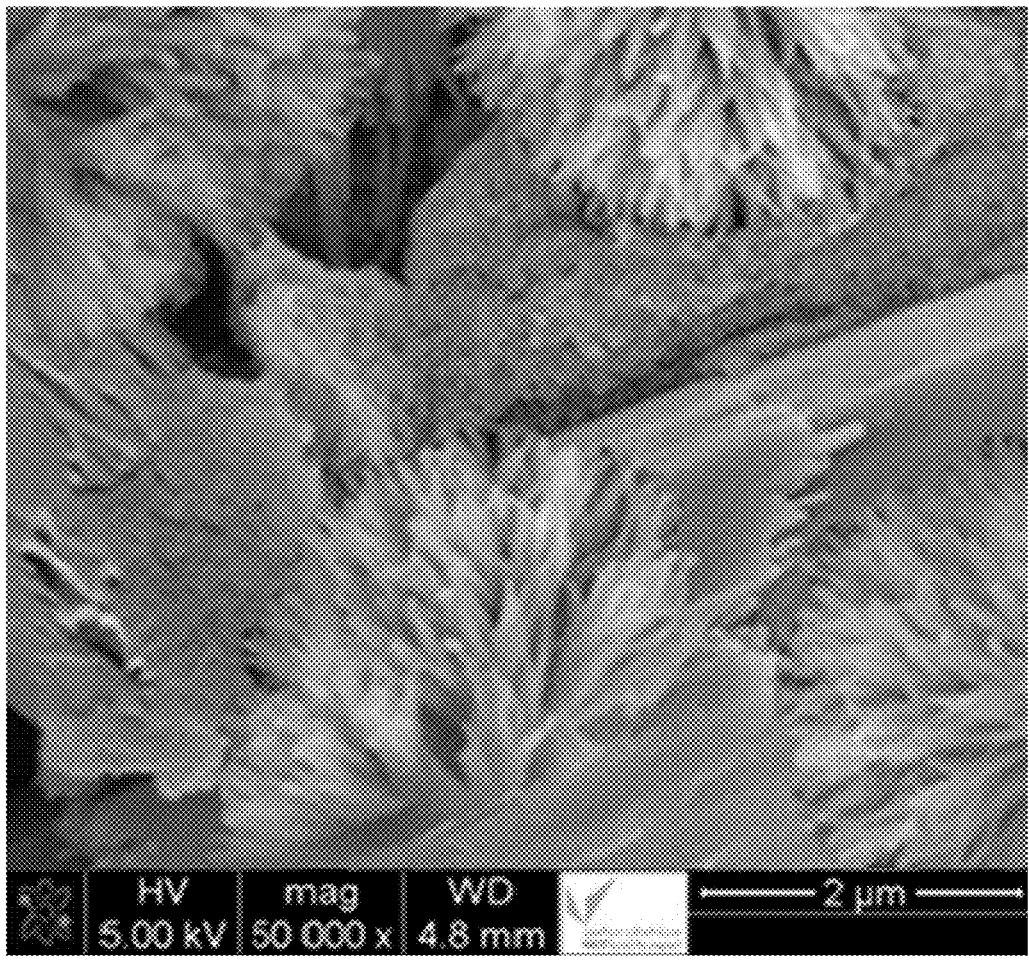
FIG. 12 shows an SEM image of the nanostructured material after being reused for 5,000 purification cycles.

The nanostructured material may be cleaned after each adsorption process and reused. The cleaning process is started by using a magnet to separate the nanostructured material from the tap water solution as shown in FIG. 10. The recovered nanostructured material is then put into an acidic solution made by mixing nitric acid (0.5 M) and sulfuric acid (0.5 M) with a 1:1 volume ratio. The recovered nanostructured material is left in the acidic solution for 2 h. After that, the nanostructured material is washed with deionized water and left to dry naturally for 3 h. To re-intercalate the nanostructured material with 3-hydroxy-4-(2-hydroxy-4-sulfo-1-naphthylazo)-2-naphthalenecarboxylic acid (calconcarboxylic acid), the nanostructured material is dispersed into a solution of calconcarboxylic acid prepared by dissolving 0.1 g of it into 20 mL acetone solution having a 1:1 volume ratio of acetone:water. Then the nanostructured material is used again to remove pharmaceutical compounds. This cleaning process is repeated each time for each reuse of the nanostructured material in adsorbing pharmaceutical compounds. The nanostructured material was used more than 5,000 times along a timespan of more than three years, while preserving its adsorption efficiency and coral reef shape as shown in FIGS. 11 and 12.

The invention claimed is:

1. A nanostructured material, comprising:
    Fe(II)/Fe(III) double hydroxide layers; and
    an azo dye intercalated between the Fe(II)/Fe(III) double hydroxide layers;
    wherein the nanostructured material is in the form of a coral reef morphology having a plurality of nanoflake walls; and
    wherein the nanoflake walls have a thickness of 10-35 nm and a largest dimension of 100 nm-1 µm.

2. The nanostructured material of claim 1, wherein the Fe(II)/Fe(III) double hydroxide layers are spaced apart by 1.7-2.3 nm.

3. The nanostructured material of claim 1, wherein the nanoflake walls have a rhombohedral lattice crystal structure.

4. The nanostructured material of claim 1, wherein the nanoflake walls have a hexagonal lattice crystal structure.

5. The nanostructured material of claim 1, wherein the azo dye is calconcarboxylic acid.

6. The nanostructured material of claim 1, wherein the average maximum distance between adjacent nanoflake walls is 70-120 nm.

7. The nanostructured material of claim 1, wherein the Fe(II)/Fe(III) double hydroxide layers have a Fe(II) to Fe(III) molar ratio of 2:1-4:1.

8. The nanostructured material of claim 1, wherein the Fe(II)/Fe(III) double hydroxide layers have a formula $[(Fe^{2+})_{1-x}(Fe^{3+})_x(OH^-)_2]^{x-}[(A^{n-})_{x/n}]^{x-} \cdot mH_2O$; wherein
    "x" is in the range of 0.05 to 0.50;
    "n" is in the range of 1 to 10;
    "m" is in the range of 0 to 10; and
    "A" is carbonate, hydroxide, chloride, nitrate, sulfate, phosphate, acetylacetonate, or an azo dye.

9. A method for producing the nanostructured material of claim 1, comprising:
    mixing a ferrous ligand coordination complex, a ferric ligand coordination complex, and an alkylamine to form a first mixture;
    mixing an azo dye, water, an organic solvent, and an amine oxide with the first mixture to form a second mixture;
    heating the second mixture to form a precipitate; and
    washing and drying the precipitate to form the nanostructured material.

10. The method of claim 9, wherein the first mixture comprises the ferrous ligand coordination complex and the ferric ligand coordination complex at a molar ratio of 2:1-4:1.

11. The method of claim 9, wherein the ferrous ligand coordination complex is ferrous acetylacetonate, and the ferric ligand coordination complex is ferric acetylacetonate.

12. The method of claim 9, wherein the alkylamine comprises at least one tertiary amine and 8-30 carbon atoms per molecule.

13. The method of claim 12, wherein the alkylamine is N-oleyl diethanolamide.

14. The method of claim 9, wherein the azo dye is calconcarboxylic acid.

15. The method of claim 9, wherein the amine oxide is trimethylamine N-oxide.

16. The method of claim 9, wherein the second mixture is heated to 150-250° C.

17. A method of reducing a contaminant concentration in a solution, the method comprising:
    mixing the nanostructured material of claim 1 with the solution comprising the contaminant at a concentration of 50 mg/L-2 g/L, wherein a concentration of the nanostructured material in the solution after mixing is 0.5-100 mg/L, and wherein the nanostructured material reduces the contaminant concentration in the solution by adsorption.

18. The method of claim 17, wherein the contaminant is a pharmaceutical compound selected from the group consisting of an antibiotic, a hormone, an anti-inflammatory, an antihypertensive, an anticonvulsant, an antidepressant and a lipid regulator.

19. The method of claim 17, further comprising:
    removing the nanostructured material from the solution with a magnet to produce a recovered nanostructured material;
    mixing the recovered nanostructured material with an acidic solution;
    drying the acidic solution to produce a cleaned nanostructured material;
    mixing the cleaned nanostructured material with the azo dye to produce a recharged nanostructured material; and
    reusing the recharged nanostructured material, which maintains adsorption capacity for at least 10 purification cycles.

20. The method of claim 19, wherein the acidic solution comprises one or more inorganic acids at a total concentration of 0.2-1.0 M.

21. The method of claim 19, wherein the mass ratio of the azo dye to the cleaned nanostructured material is 50:1-200:1.

* * * * *